US012628049B2

(12) United States Patent
Centonza et al.

(10) Patent No.: US 12,628,049 B2
(45) Date of Patent: May 12, 2026

(54) METHOD FOR COORDINATION OF CONTROL PLANE TRAFFIC MANAGEMENT DURING DEVICE RECONFIGURATIONS AND RELATED APPARATUS

(71) Applicant: Telefonaktiebolaget LM Ericsson (publ), Stockholm (SE)

(72) Inventors: Angelo Centonza, Torrenueva Costa (ES); Thomas Walldeen, Linköping (SE); Fredrik Hultin, Vikingstad (SE); Ioanna Pappa, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 979 days.

(21) Appl. No.: 17/773,122

(22) PCT Filed: Oct. 28, 2020

(86) PCT No.: PCT/SE2020/051042
§ 371 (c)(1),
(2) Date: Apr. 29, 2022

(87) PCT Pub. No.: WO2021/091456
PCT Pub. Date: May 14, 2021

(65) Prior Publication Data
US 2022/0369174 A1 Nov. 17, 2022

Related U.S. Application Data

(60) Provisional application No. 62/933,335, filed on Nov. 8, 2019.

(51) Int. Cl.
*H04W 4/00* (2018.01)
*H04L 1/1607* (2023.01)
(Continued)

(52) U.S. Cl.
CPC ....... *H04W 36/0033* (2013.01); *H04L 1/1642* (2013.01); *H04W 36/087* (2023.05);
(Continued)

(58) Field of Classification Search
None
See application file for complete search history.

(56) References Cited

U.S. PATENT DOCUMENTS 11,533,775 B2 * 12/2022 Liu ........................ H04W 36/06
2016/0183221 A1 * 6/2016 Yi ......................... H04L 1/1851
370/329
(Continued)

FOREIGN PATENT DOCUMENTS

WO 2018203702 A1 11/2018

OTHER PUBLICATIONS

Extended European Search Report for European Patent Application No. 20884515.6 dated Dec. 6, 2022.
(Continued)

*Primary Examiner* — Zewdu A Beyen
(74) *Attorney, Agent, or Firm* — Sage Patent Group

(57) ABSTRACT

The present disclosure relates generally to communications, and more particularly to communication methods and related devices and nodes for control plane traffic management. Among other things, the disclosure presents a method performed by a central unit (CU) of a network node for coordination of control plane traffic management during a communication device reconfiguration in a telecommunications network. The method may, e.g., comprise receiving information from a distributed unit (DU) of the network node alerting the CU to reset a packet data convergence protocol (PDCP) sequence number of control plane traffic signaled from the communication device as a consequence of an event in the telecommunications network; and respon-
(Continued)

sive to receiving the information, resetting the PDCP sequence number of the control plane traffic signaled from the communication device.

20 Claims, 20 Drawing Sheets

(51) Int. Cl.

| | |
|---|---|
| *H04W 36/00* | (2009.01) |
| *H04W 36/08* | (2009.01) |
| *H04W 76/19* | (2018.01) |
| *H04W 92/24* | (2009.01) |

(52) U.S. Cl.

CPC ........ *H04W 76/19* (2018.02); *H04W 36/0011* (2013.01); *H04W 92/24* (2013.01)

(56) References Cited

U.S. PATENT DOCUMENTS

| | | | | |
|---|---|---|---|---|
| 2020/0068639 A1* | 2/2020 | Kim | ...................... | H04W 76/16 |
| 2020/0154333 A1* | 5/2020 | Paladugu | ............. | H04B 7/0452 |

OTHER PUBLICATIONS

Ericsson, "Intra-gNB-CU mobility procedures," R3-173967, 3GPP TSG-RAN WG3 #97bis, Prague, Sep. 2017, 6 pages.

Huawei, "Support of eMBB handover on E1," R3-195571, 3GPP TSG-RAN3 Meeting #105bis, Chongqing, China, Oct. 14-18, 2019, 3 pages.

Ericsson, "Solution #1 of Key Issue 1: Redundant user plane paths based on dual connectivity," R3-195326, 3GPP TSG-RAN WG3 Meeting #105bis, Chongqing, P.R. China, Oct. 14-18, 2019, 25 pages.

He Huang et al., "Mechanism of Fast Data Retransmission in CU-DU Split Architecture of 5G NR," Research Paper, ZTE Communications, vol. 16, No. 3, Sep. 2018, pp. 40-44.

International Search Report and Written Opinion of the International Searching Authority for PCT International Application No. PCT/SE2020/051042 dated Feb. 22, 2021.

CATT, "Correction on intra-DU handover," R3-181072, 3GPP TSG-RAN WG3#99, Athens, Greece, Feb. 26-Mar. 2, 2018, 3 pages.

Intel Corporation, "Correction for correct DDDS for retransmitted packets, " R3-186937, 3GPP TSG-RAN WG3 Meeting #102, Spokane, Washington, USA, Nov. 12-16, 2018, 6 pages.

Ericsson, "Considerations regarding intra-DU HO," R3-197347, 3GPP TSG-RAN3 Meeting #106, Reno, Nevada, USA, Nov. 18-22, 2019, 2 pages.

Ericsson, "Considerations regarding intra-DU HO," R3-200930, 3GPP TSG-RAN3 #107e, Feb. 24-Mar. 6, 2020, 3 pages.

3GPP TS 38.401 V15.6.0, "3rd Generation Partnership Project; Technical Specification Group Radio Access Network; NG-RAN; Architecture description (Release 15)," Jul. 2019, 46 pages.

3GPP TS 38.423 V15.5.0, "3rd Generation Partnership Project; Technical Specification Group Radio Access Network; NG-RAN; Xn application protocol (XnAP) (Release 15)," Sep. 2019, 311 pages.

3GPP TS 38.470 V15.6.0, "3rd Generation Partnership Project; Technical Specification Group Radio Access Network; NG-RAN; F1 general aspects and principles (Release 15)," Jul. 2019, 13 pages.

3GPP TS 38.473 V15.7.0, "3rd Generation Partnership Project; Technical Specification Group Radio Access Network; NG-RAN; F1 application protocol (F1AP) (Release 15)," Sep. 2019, 221 pages.

3GPP TS 23.501 V15.6.0, "3rd Generation Partnership Project; Technical Specification Group Services and System Aspects; System Architecture for the 5G System; Stage 2 (Release 15)," Jun. 2019, 243 pages.

3GPP TS 36.300 V15.7.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Sep. 2019, 365 pages.

3GPP TS 36.413 V15.7.1, "3rd Generation Partnership Project; Technical Specification Group Radio Access Network; Evolved Universal Terrestrial Radio Access Network (E-UTRAN); S1 Application Protocol (S1AP) (Release 15)," Oct. 2019, 388 pages.

3GPP TS 36.423 V15.7.0, "3rd Generation Partnership Project; Technical Specification Group Radio Access Network; Evolved Universal Terrestrial Radio Access Network (E-UTRAN); X2 application protocol (X2AP) (Release 15)," Sep. 2019, 422 pages.

3GPP TS 38.331 V15.7.0, "3rd Generation Partnership Project; Technical Specification Group Radio Access Network; NR; Radio Resource Control (RRC) protocol specification (Release 15)," Sep. 2019, 527 pages.

* cited by examiner

Communication Device
(1200)

Transceiver
1201

Processor
1203

Memory
1205

Figure 14

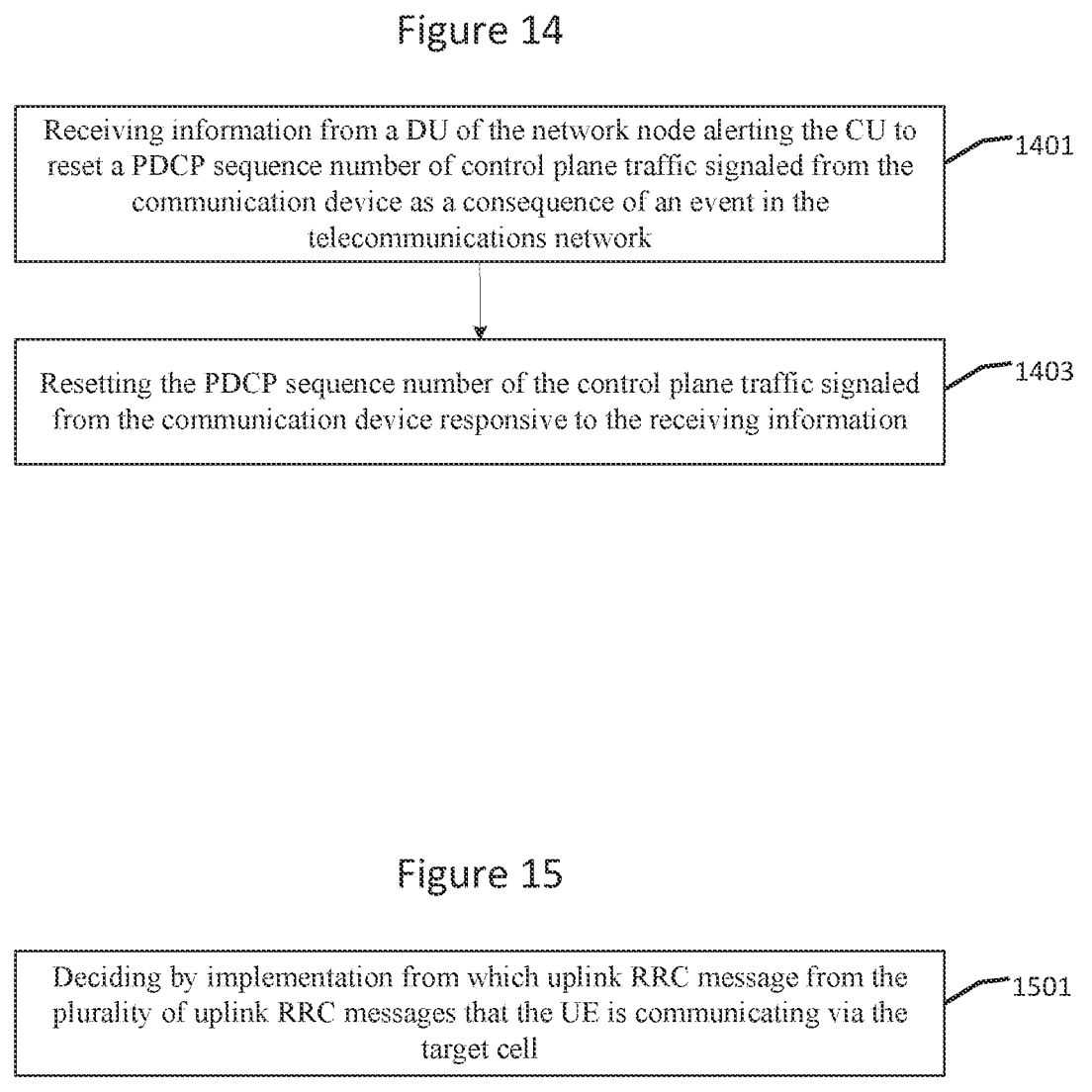

Receiving information from a DU of the network node alerting the CU to reset a PDCP sequence number of control plane traffic signaled from the communication device as a consequence of an event in the telecommunications network ⟋1401

Resetting the PDCP sequence number of the control plane traffic signaled from the communication device responsive to the receiving information ⟋1403

Figure 15

Deciding by implementation from which uplink RRC message from the plurality of uplink RRC messages that the UE is communicating via the target cell ⟋1501

Figure 16

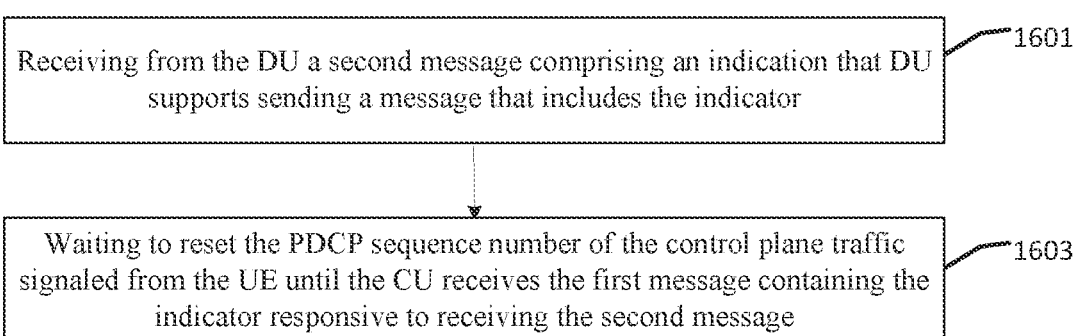

Receiving from the DU a second message comprising an indication that DU supports sending a message that includes the indicator — 1601

Waiting to reset the PDCP sequence number of the control plane traffic signaled from the UE until the CU receives the first message containing the indicator responsive to receiving the second message — 1603

Figure 17

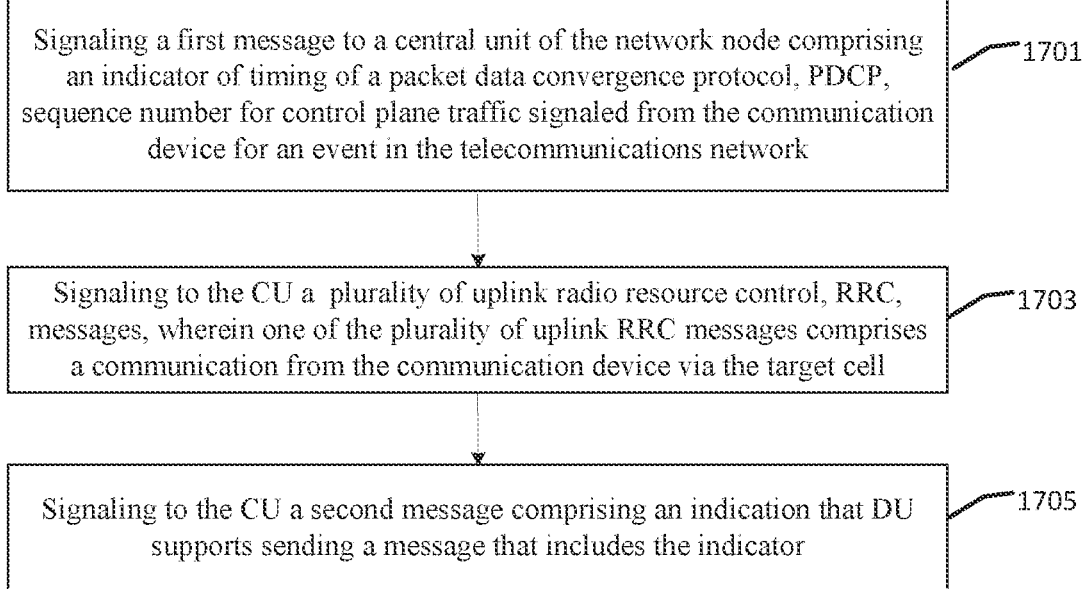

Signaling a first message to a central unit of the network node comprising an indicator of timing of a packet data convergence protocol, PDCP, sequence number for control plane traffic signaled from the communication device for an event in the telecommunications network — 1701

Signaling to the CU a plurality of uplink radio resource control, RRC, messages, wherein one of the plurality of uplink RRC messages comprises a communication from the communication device via the target cell — 1703

Signaling to the CU a second message comprising an indication that DU supports sending a message that includes the indicator — 1705

BEGIN

2410
Host computer
provides user data

2420
Host computer
initiates transmission
carrying the user data
to the UE

2430
UE receives the user
data

END

METHOD FOR COORDINATION OF CONTROL PLANE TRAFFIC MANAGEMENT DURING DEVICE RECONFIGURATIONS AND RELATED APPARATUS

CROSS REFERENCE TO RELATED APPLICATIONS

This application is a 35 U.S.C. § 371 national stage application of PCT International Application No. PCT/SE2020/051042 filed on Oct. 28, 2020, which claims the benefit of U.S. Provisional Patent Application Ser. No. 62/933,335, filed on Nov. 8, 2019, the disclosures and content of which are incorporated by reference herein in their entireties.

TECHNICAL FIELD

The present disclosure relates generally to communications, and more particularly to communication methods and related devices and nodes for control plane traffic management.

BACKGROUND

The current 5G Radio Access Network (RAN) is described in 3GPP Technical Specification (TS) 38.401 v15.6.0.

FIG. 1 illustrates the overall architecture of current 5G Radio Access Network (RAN) architecture described in TS38.401 v15.6.0 as follows:

The NG-RAN includes a set of g NodeBs (gNBs) connected to the 5G Core Network (5GC) through the NG.

A gNB can support Frequency Division Duplex (FDD) mode, Time Division Duplex (TDD) mode or dual mode operation.

gNBs can be interconnected through the Xn.

A gNB may include a gNB-Central Unit (CU) and gNB-Distributed Units (DUs).

A gNB-CU and a gNB-DU are connected via F1 logical interface.

One gNB-DU is connected to only one gNB-CU.

NG, Xn and F1 are logical interfaces. For NG-RAN, the NG and Xn-C interfaces for a gNB including a gNB-CU and gNB-DUs, terminate in the gNB-CU. For EN-DC, the S1-U and X2-C interfaces for a gNB including of a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, described above (the NG-RAN logical nodes and interfaces between them) is defined as part of the RNL. For each NG-RAN interface (NG, Xn, F1), the related TNL protocol and the functionality are specified. The TNL provides services for user plane transport and signaling transport. In NG-Flex configuration, each gNB is connected to all access management function (AMF) nodes within an AMF Region. The AMF Region is defined in 3GPP TS 23.501.

In a split gNB architecture the event of a handover is managed by F1AP procedures that: modify the User Equipment (UE) context, support signaling of radio resource control (RRC) messages to and from the UE to allow opportune UE reconfigurations aimed at letting the UE properly handover to the target cell, such as the F1: UE Context Modification Procedure; and/or purely allow the transfer of RRC messages between gNB-CU-control plane (CP) and gNB-DU, such as the RRC Message Transfer procedures.

SUMMARY

It is in view of the above considerations and others that the various embodiments of the present invention have been made.

It is therefore a general object of embodiments described herein to allow for an improved coordination of control plane traffic management during a communication device reconfiguration in a telecommunications network.

This general object has been addressed by the appended independent claims. Advantageous embodiments have been described in the appended dependent claims.

In a first of its aspects, the present disclosure presents a method performed by a central unit (CU) of a network node for coordination of control plane traffic management during a communication device reconfiguration in a telecommunications network. The method comprises: receiving information from a distributed unit (DU) of the network node alerting the CU to reset a packet data convergence protocol (PDCP) sequence number of control plane traffic signaled from the communication device as a consequence of an event in the telecommunications network; and responsive to receiving the information, resetting the PDCP sequence number of the control plane traffic signaled from the communication device.

In some embodiments, the information from the DU of the network node alerting the CU to reset a PDCP sequence number of control plane traffic signaled from the communication device comprises receiving from the DU a first message comprising an uplink message from a target cell and an indicator that the uplink message is the first message sent from the target cell.

In some embodiments, the uplink message comprises a radio resource control (RRC) message from the target cell.

In some embodiments, the indicator comprises a flag indicating that the RRC message is a first message sent from the target cell.

In some embodiments, the flag comprises a re-established signaling radio bearer (SRB) flag indicating that the RRC message is the first message on a re-established SRB flow.

In some embodiments, wherein the first message is received from the DU over an F1 interface.

In some embodiments, the first message comprises an uplink RRC message transfer message.

In some embodiments, the method further comprises: receiving from the DU a second message comprising an indication that the DU supports sending a message that includes the indicator; and responsive to receiving the second message, to reset the PDCP sequence number of the control plane traffic signaled from the UE until the CU receives the first message containing the indicator.

In some embodiments, the second message comprises a UE context modification response.

In some embodiments, the indication comprises a re-established signal radio bearer, SRB, indicator indicating that the DU supports the SRB flag.

In some embodiments, the network node is a gNB.

In some embodiments, the communication device is a user equipment, UE.

In some embodiments, the event comprises an intra gNB-DU handover.

In a second of its aspects, the present disclosure presents a central unit of a network node comprising: processing circuitry; and memory coupled with the processing circuitry, wherein the memory includes instructions that when executed by the processing circuitry causes the central unit to perform operations according to the first aspect.

In a third of its aspects, the present disclosure presents a central unit of a network node adapted to perform a method according to the first aspect.

In a fourth of its aspects, the present disclosure presents a computer program comprising program code to be executed by processing circuitry of a central unit of a network node, whereby execution of the program code causes the central unit to perform operations according to the first aspect.

In a fifth of its aspects, the present disclosure presents a computer program product comprising a non-transitory storage medium including program code to be executed by processing circuitry of a central unit of a network node, whereby execution of the program code causes the central unit to perform operations according to the first aspect.

In a sixth of its aspects, the present disclosure presents a method performed by a distributed unit (DU) of a network node for coordination of control plane traffic management during a communication device reconfiguration in a telecommunications network. The method comprises: signaling a first message to a central unit (CU) of the network node comprising an indicator of timing of a packet data convergence protocol (PDCP) sequence number for control plane traffic signaled from the communication device for an event in the telecommunications network.

In some embodiments, the signaling of the first message to the CU comprises signaling the first message comprising an uplink message from a target cell and the indicator that the uplink message is a first message sent from the target cell.

In some embodiments, the uplink message comprises a radio resource control (RRC) message from the target cell.

In some embodiments, the indicator comprises a flag indicating that the RRC message is the first message sent from the target cell.

In some embodiments, the flag comprises a re-established signaling radio bearer (SRB) flag indicating that the RRC message is the first message on a re-established SRB flow.

In some embodiments, the first message is signaled by the DU to the CU over an F1 interface.

In some embodiments, the first message comprises an uplink RRC message transfer message.

In some embodiments, the method comprises signaling to the CU a plurality of uplink radio resource control (RRC) messages, wherein one of the plurality of uplink RRC messages comprises a communication from the communication device via the target cell.

In some embodiments, the method further comprises: signaling to the CU a second message comprising an indication that the DU supports sending a message that includes the indicator.

In some embodiments, the second message comprises a UE context modification response.

In some embodiments, the indication comprises a reestablished signal radio bearer, SRB, indicator indicating that the DU supports the SRB flag.

In some embodiments, the network node (1300) is a gNB.

In some embodiments, the communication device (1200) is a user equipment, UE.

In some embodiments, the event comprises an intra gNB-DU handover.

In a seventh of its aspects, the present disclosure presents a distributed unit of a network node comprising: processing circuitry; and memory coupled with the processing circuitry, wherein the memory includes instructions that when executed by the processing circuitry causes the distributed unit of the network node to perform operations according to the sixth aspect.

In an eighth of its aspects, the present disclosure presents a distributed unit of a network node adapted to perform a method according to the sixth aspect.

In a ninth of its aspects, the present disclosure presents a computer program comprising program code to be executed by processing circuitry of a distributed unit of a network node, whereby execution of the program code causes the distributed unit of the network node to perform operations according to the sixth aspect.

In a tenth of its aspects, the present disclosure presents a computer program product comprising a non-transitory storage medium including program code to be executed by processing circuitry of a distributed unit of a network node, whereby execution of the program code causes the distributed unit of the network node to perform operations according to the sixth aspect.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 12 is a block diagram illustrating a communication device according to some embodiments of inventive concepts;

FIG. 14 illustrates a flow chart of operations that can be performed by the CU in accordance with various embodiments;

FIG. 15 illustrates a flow chart of operations that can be performed by the CU in accordance with various embodiments;

FIG. 16 illustrates a flow chart of operations that can be performed by the CU in accordance with various embodiments;

FIG. 17 illustrates a flow chart of corresponding operations that can be performed by a DU in accordance with some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As referred to herein, the term user equipment (UE) may be used interchangeably with the term communication device. A communication device includes, but is not limited to, any device intended for accessing services via an access network and configured to communicate over the access network. For instance, the communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocket storable, hand-held, computer-comprised, or vehicle-mounted mobile device, enabled to communicate voice and/or data, via a wireless or wireline connection. Communication device 1200 also may include a wired connection to, e.g., a network node or another communication device via a network interface (not shown).

The F1AP procedures referred to above are described in the 3GPP TS 38.473 v15.7.0, and are shown below:

8.3.4 UE Context Modification (gNB-CU Initiated)

8.3.4.1 General

The purpose of the UE Context Modification procedure is to modify the established UE Context, e.g., establishing, modifying and releasing radio resources. This procedure is also used to command the gNB-DU to stop data transmission for the UE for mobility (see TS 38.401 [4]). The procedure uses UE-associated signaling.

8.3.4.2 Successful Operation

Figure 1:
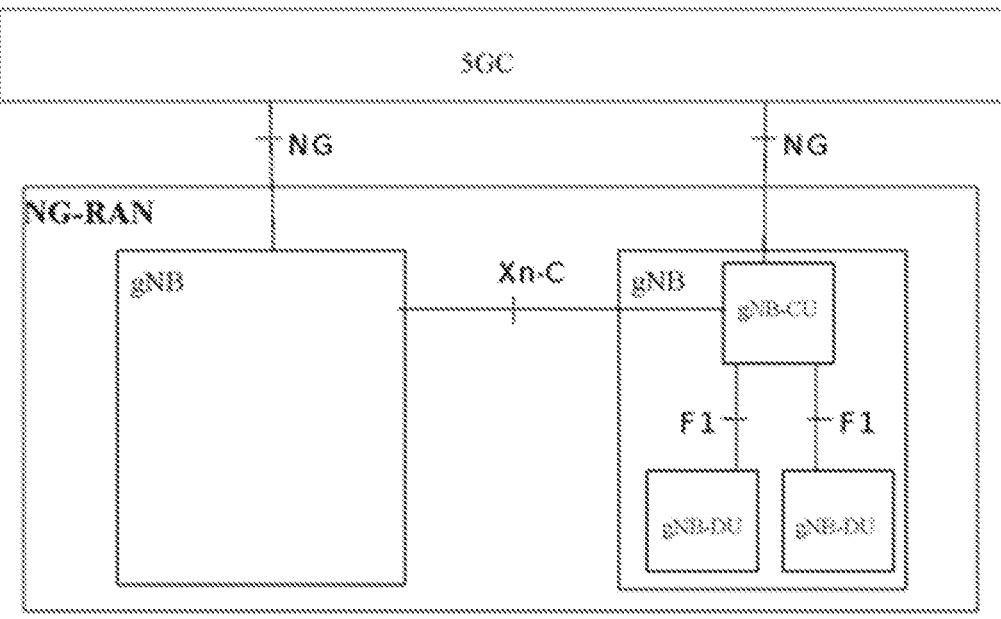
FIG. 1 illustrates the overall architecture of current 5G RAN architecture described in 3GPP TS38.401 v15.6.0.
Figure 2:
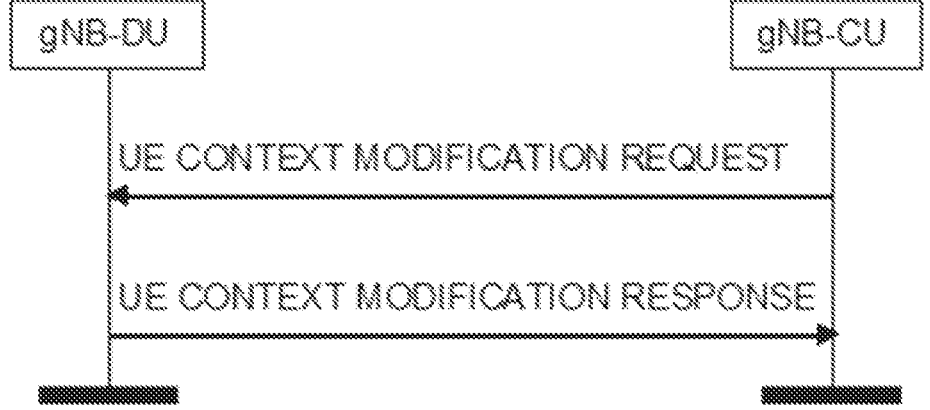
FIG. 2 illustrates a successful operation of a User Equipment Context Modification procedure.
Figure 8:
FIG. 8 illustrates a UL RRC Message Transfer procedure.

FIG. 2 is FIG. 8.3.4.2-1 illustrating a successful operation of a UE Context Modification procedure.

The UE CONTEXT MODIFICATION REQUEST message is initiated by the gNB-CU.

Upon reception of the UE CONTEXT MODIFICATION REQUEST message, the gNB-DU shall perform the modifications, and if successful reports the update in the UE CONTEXT MODIFICATION RESPONSE message.

If the SpCell ID IE is included in the UE CONTEXT MODIFICATION REQUEST message, the gNB-DU shall replace any previously received value and regard it as a reconfiguration with sync as defined in TS 38.331 [8]. If the ServCellIndex IE is included in the UE CONTEXT MODIFICATION REQUEST message, the gNB-DU shall take this into account for the indicated SpCell. If the SpCell UL Configured IE is included in the UE CONTEXT MODIFICATION REQUEST message, the gNB-DU shall configure UL for the indicated SpCell accordingly. If the servingCellMO IE is included in the UE CONTEXT MODIFICATION REQUEST message, the gNB-DU shall configure servingCellMO for the indicated SpCell accordingly.

If the SCell To Be Setup List IE or SCell To Be Removed List IE is included in the UE CONTEXT MODIFICATION REQUEST message, the gNB-DU shall act as specified in TS 38.401 [4]. If the SCell To Be Setup List IE is included in the UE CONTEXT MODIFICATION REQUEST message and the indicated SCell(s) are already setup, the gNB-DU shall replace any previously received value. If the SCell UL Configured IE is included in the UE CONTEXT MODIFICATION REQUEST message, the gNB-DU shall configure UL for the indicated SCell accordingly. If the servingCellMO IE is included in the UE CONTEXT MODIFICATION REQUEST message, the gNB-DU shall configure servingCellMO for the indicated SCell accordingly.

If the DRX Cycle IE is contained in the UE CONTEXT MODIFICATION REQUEST message, the gNB-DU shall use the provided value from the gNB-CU. If the DRX configuration indicator IE is contained in the UE CONTEXT MODIFICATION REQUEST message and set to "release", the gNB-DU shall release DRX configuration.

If the SRB To Be Setup List IE is contained in the UE CONTEXT MODIFICATION REQUEST message, the gNB-DU shall act as specified in the TS 38.401 [4], and replace any previously received value. If Duplication Indication IE is contained in the SRB To Be Setup List IE, the gNB-DU shall, if supported, setup two RLC entities for the indicated SRB if the value is set to be "true", or delete the RLC entity of secondary path if the value is set to be "false".

If the DRB To Be Setup List IE is contained in the UE CONTEXT MODIFICATION REQUEST message, the gNB-DU shall act as specified in the TS 38.401 [4].

If two UL UP TNL Information IEs are included in UE CONTEXT MODIFICATION REQUEST message for a DRB, the gNB-DU shall include two DL UP TNL Information IEs in UE CONTEXT MODIFICATION RESPONSE message and setup two RLC entities for the indicated DRB. gNB-CU and gNB-DU use the UL UP TNL Information IEs and DL UP TNL Information IEs to support packet duplication for intra-gNB-DU CA as defined in TS 38.470 [2]. The first UP TNL Information IE of the two UP TNL Information IEs is for the primary path.

If Duplication Activation IE is included in the UE CONTEXT MODIFICATION REQUEST message for a DRB, the gNB-DU should take it into account when activating/deactivating CA based PDCP duplication for the DRB.

If DC Based Duplication Configured IE is included in the UE CONTEXT MODIFICATION REQUEST message for a DRB, the gNB-DU shall regard that DC based PDCP duplication is configured for this DRB if the value is set to be "true" and it should take the responsibility of PDCP duplication activation/deactivation. Otherwise, the gNB-DU shall regard that DC based PDCP duplication is de-configured for this DRB id the value is set to be "false", and it should stop PDCP duplication activation/deactivation by MAC CE. If DC Based Duplication Activation IE is included in the UE CONTEXT MODIFICATION REQUEST message for a DRB, the gNB-DU should take it into account when activating/deactivating DC based PDCP duplication for this DRB.

For a certain DRB which was allocated with two GTP-U tunnels, if such DRB is modified and given one GTP-U tunnel via the UE Context Modification procedure, the gNB-DU shall consider that the CA based PDCP duplication for the concerned DRB is de-configured. If such UE Context Modification procedure occurs, the Duplication Activation IE shall not be included for the concerned DRB.

If the UL Configuration IE in DRB to Be Setup Item IE or DRB to Be Modified Item IE is contained in the UE CONTEXT MODIFICATION REQUEST message, the gNB-DU shall take it into account for UL scheduling.

If the ongoing reconfiguration procedure involves changes of the L1/L2 configuration at the gNB-DU signalled to the gNB-CU via the CellGroupConfig IE, the gNB-CU shall include the RRC Reconfiguration Complete Indicator IE in the UE CONTEXT MODIFICATION REQUEST message to inform the gNB-DU that the ongoing reconfiguration procedure, including CellGroupConfig IE, has been successfully or unsuccessfully performed. In the case that the ongoing reconfiguration procedure has failed, the gNB-DU shall continue to use the old UE configuration.

If DL PDCP SN length IE is included in the UE CONTEXT MODIFICATION REQUEST message for a DRB, gNB-DU shall, if supported, store this information and use it for lower layer configuration.

If UL PDCP SN length IE is included in the UE CONTEXT MODIFICATION REQUEST message for a DRB, gNB-DU shall, if supported, store this information and use it for lower layer configuration.

If the RLC Failure Indication IE is included in UE CONTEXT MODIFICATION REQUEST message, the gNB-DU should consider that the RLC entity indicated by such IE needs to be re-established when the CA-based packet duplication is active, and the gNB-DU may include the Associated SCell List IE in UE CONTEXT MODIFI- CATION RESPONSE by containing a list of SCell(s) associated with the RLC entity indicated by the RLC Failure Indication IE.

If the UE CONTEXT MODIFICATION REQUEST message contains the RRC-Container IE, the gNB-DU shall send the corresponding RRC message to the UE. If the UE CONTEXT MODIFICATION REQUEST message includes the Execute Duplication IE, the gNB-DU shall perform CA based duplication, if configured, for the SRB for the included RRC-Container IE.

If the UE CONTEXT MODIFICATION REQUEST message contains the Transmission Action Indicator IE, the gNB-DU shall stop or restart (if already stopped) data transmission for the UE, according to the value of this IE. It is up to gNB-DU implementation when to stop or restart the UE scheduling.

For EN-DC operation, if the DRB to Be Setup List IE is present in the UE CONTEXT MODIFICATION REQUEST message the gNB-CU shall include the E-UTRAN QoS IE. The allocation of resources according to the values of the Allocation and Retention Priority IE included in the E-UTRAN QoS IE shall follow the principles described for the E-RAB Setup procedure in TS 36.413 [15]. For NG-RAN operation, the gNB-CU shall include the DRB Information IE in the UE CONTEXT MODIFICATION REQUEST message.

If the gNB-CU includes the SMTC information of the measured frequency(ies) in the MeasurementTimingConfiguration IE of the CU to DU RRC Information IE that is included in the UE CONTEXT MODIFICATION REQUEST message, the gNB-DU shall generate the measurement gaps based on the received SMTC information. Then the gNB-DU shall send the measurement gaps information to the gNB-CU in the MeasGapConfig IE of the DU to CU RRC Information IE that is included in the UE CONTEXT MODIFICATION RESPONSE message.

For DC operation, if the gNB-CU includes the CG-Config IE in the CU to DU RRC Information IE that is included in the UE CONTEXT MODIFICATION REQUEST message, the gNB-DU may initiate low layer parameters coordination taking this information into account.

For EN-DC operation, if the gNB-CU includes the Resource Coordination Transfer Information IE in the UE CONTEXT MODIFICATION REQUEST message, the gNB-DU shall, if supported, use it for the purpose of resource coordination. If the gNB-CU received the MeNB Resource Coordination Information as defined in TS 36.423 [9], after completion of UE Context Setup procedures, the gNB-CU shall transparently transfer it to the gNB-DU via the Resource Coordination Transfer Container IE in the UE CONTEXT MODIFICATION REQUEST message. The gNB-DU shall use the information received in the Resource Coordination Transfer Container IE for reception of MeNB Resource Coordination Information at the gNB acting as secondary node as described in TS 36.423 [9]. If the Resource Coordination E-UTRA Cell Information IE is included in the Resource Coordination Transfer Information IE, the gNB-DU shall store the information replacing previously received information for the same E-UTRA cell, and use the stored information for the purpose of resource coordination. If the Ignore PRACH Configuration IE is present and set to "true" the E-UTRA PRACH Configuration IE in the UE CONTEXT MODIFICATION REQUEST message shall be ignored.

For NGEN-DC or NE-DC operation, if the gNB-CU includes the Resource Coordination Transfer Information IE in the UE CONTEXT MODIFICATION REQUEST message, the gNB-DU shall, if supported, use it for the purpose of resource coordination. If the gNB-CU received the MR-DC Resource Coordination Information as defined in TS 38.423 [28], after completion of UE Context Setup procedures, the gNB-CU shall transparently transfer it to the gNB-DU via the Resource Coordination Transfer Container IE in the UE CONTEXT MODIFICATION REQUEST message. The gNB-DU shall use the information received in the Resource Coordination Transfer Container IE for reception of MR-DC Resource Coordination Information at the gNB as described in TS 38.423 [28].

For EN-DC operation, and if the Subscriber Profile ID for RAT/Frequency priority IE is received from an MeNB, the UE CONTEXT MODIFICATION REQUEST message shall contain the Subscriber Profile ID for RAT/Frequency priority IE. The gNB-DU shall store the received Subscriber Profile ID for RAT/Frequency priority in the UE context and use it as defined in TS 36.300 [20].

If the Index to RAT/Frequency Selection Priority IE is modified at the gNB-CU, the Index to RAT/Frequency Selection Priority IE shall be included in the UE CONTEXT MODIFICATION REQUEST. The gNB-DU may use it for RRM purposes.

If the UE CONTEXT MODIFICATION REQUEST message contains the Uplink TxDirectCurrentList Information IE, the gNB-DU may take that into account when selecting L1 configuration.

The UEAssistanceInformation IE shall be included in CU to DU RRC Information IE in the UE CONTEXT MODIFICATION REQUEST message if the gNB-CU received this IE from the UE; if the UEAssistanceInformation IE is included in the CU to DU RRC Information IE in the UE CONTEXT MODIFICATION REQUEST message, the gNB-DU shall, if supported, take it into account when configuring resources for the UE.

The gNB-DU shall report to the gNB-CU, in the UE CONTEXT MODIFICATION RESPONSE message, the result for all the requested or modified DRBs and SRBs in the following way:

A list of DRBs which are successfully established shall be included in the DRB Setup List IE;

A list of DRBs which failed to be established shall be included in the DRB Failed to be Setup List IE;

A list of DRBs which are successfully modified shall be included in the DRB Modified List IE;

A list of DRBs which failed to be modified shall be included in the DRB Failed to be Modified List IE;

A list of SRBs which failed to be established shall be included in the SRB Failed to be Setup List IE.

A list of successfully established SRBs with logical channel identities for primary path shall be included in the SRB Setup List IE only if CA based PDCP duplication is initiated for the concerned SRBs.

A list of successfully modified SRBs with logical channel identities for primary path shall be included in the SRB Modified List IE only if CA based PDCP duplication is initiated for the concerned SRBs.

When the gNB-DU reports the unsuccessful establishment of a DRB or SRB, the cause value should be precise enough to enable the gNB-CU to know the reason for the unsuccessful establishment.

If the Resource Coordination Transfer Container IE is included in the UE CONTEXT MODIFICATION RESPONSE, the gNB-CU shall transparently transfer this information for the purpose of resource coordination as described in TS 36.423 [9], TS 38.423 [28].

If the CellGroupConfig IE is included in the DU to CU RRC Information IE contained in the UE CONTEXT MODIFICATION RESPONSE message, the gNB-CU shall perform RRC Reconfiguration as described in TS 38.331 [8]. The CellGroupConfig IE shall transparently be signaled to the UE as specified in TS 38.331 [8].

If the UE-CapabilityRAT-ContainerList IE is included in the UE CONTEXT SETUP MODIFICATION REQUEST, the gNB-DU shall take this information into account for UE specific configurations.

If the SCell Failed To Setup List IE is contained in the UE CONTEXT MODIFICATION RESPONSE message, the gNB-CU shall regard the corresponding SCell(s) failed to be established with an appropriate cause value for each SCell failed to setup.

If the C-RNTI IE is included in the UE CONTEXT MODIFICATION RESPONSE, the gNB-CU shall consider that the C-RNTI has been allocated by the gNB-DU for this UE context.

If the Inactivity Monitoring Request IE is contained in the UE CONTEXT MODIFICATION REQUEST message, gNB-DU may consider that the gNB-CU has requested the gNB-DU to perform UE inactivity monitoring. If the Inactivity Monitoring Response IE is contained in the UE CONTEXT MODIFICATION RESPONSE message and set to "Not-supported", the gNB-CU shall consider that the gNB-DU does not support UE inactivity monitoring for the UE.

The UE Context Modify Procedure is not used to configure SRB0.

If the Notification Control IE is included in the DRB to Be Setup List IE or the DRB to Be Modified List IE and it is set to active, the gNB-DU shall, if supported, monitor the QoS of the DRB and notify the gNB-CU if the QoS cannot be fulfilled any longer or if the QoS can be fulfilled again. The Notification Control IE can only be applied to GBR bearers.

If the UL PDU Session Aggregate Maximum Bit Rate IE is included in the QoS Flow Level QoS Parameters IE contained in the UE CONTEXT MODIFICATION REQUEST message, the gNB-DU shall replace the received UL PDU Session Aggregate Maximum Bit Rate and use it as specified in TS 23.501 [21].

If the gNB-DU UE Aggregate Maximum Bit Rate Uplink IE is included in the UE CONTEXT MODIFICATION REQUEST message, the gNB-DU shall:

replace the previously provided gNB-DU UE Aggregate Maximum Bit Rate Uplink with the new received gNB-DU UE Aggregate Maximum Bit Rate Uplink;

use the received gNB-DU UE Aggregate Maximum Bit Rate Uplink for non-GBR Bearers for the concerned UE.

The UL PDU Session Aggregate Maximum Bit Rate IE shall be sent if DRB to Be Setup List IE is included and the gNB-CU has not previously sent it. The gNB-DU shall store and use the received gNB-DU UE Aggregate Maximum Bit Rate Uplink.

If the RLC Status IE is included in the UE CONTEXT MODIFICATION RESPONSE message, the gNB-CU shall assume that RLC has been reestablished at the gNB-DU and may trigger PDCP data recovery.

If the GNB-DU Configuration Query IE is contained in the UE CONTEXT MODIFICATION REQUEST message, gNB-DU shall include the CellGroupConfig IE in the DU To CU RRC Information IE in the UE CONTEXT MODIFICATION RESPONSE message.

If the Bearer Type Change IE is included in DRB to Be Modified List IE in the UE CONTEXT MODIFICATION REQUEST message, the gNB-DU shall either reset the lower layers or generate a new LCID for the affected bearer as specified in TS 37.340[7].

For NE-DC operation, if NeedforGap IE is included in the UE CONTEXT MODIFICATION REQUEST message, the gNB-DU shall generate measurement gap for the SeNB.

If the QoS Flow Mapping Indication IE is included in the UE CONTEXT MODIFICATION REQUEST message, the gNB-DU shall, if supported, replace any previously received value and take it into account that only the uplink or downlink QoS flow is mapped to the DRB.

If the Full Configuration IE is contained in the UE CONTEXT MODIFICATION REQUEST message, the gNB-DU shall generate a CellGroupConfig IE using full configuration and include it in the UE CONTEXT MODI-FICATION RESPONSE.

If the Full Configuration IE is contained in the UE CONTEXT MODIFICATION RESPONSE message, the gNB-CU shall consider that the gNB-DU has generated the CellGroupConfig IE using full configuration.

8.3.4.3 Unsuccessful Operation

Figure 3:
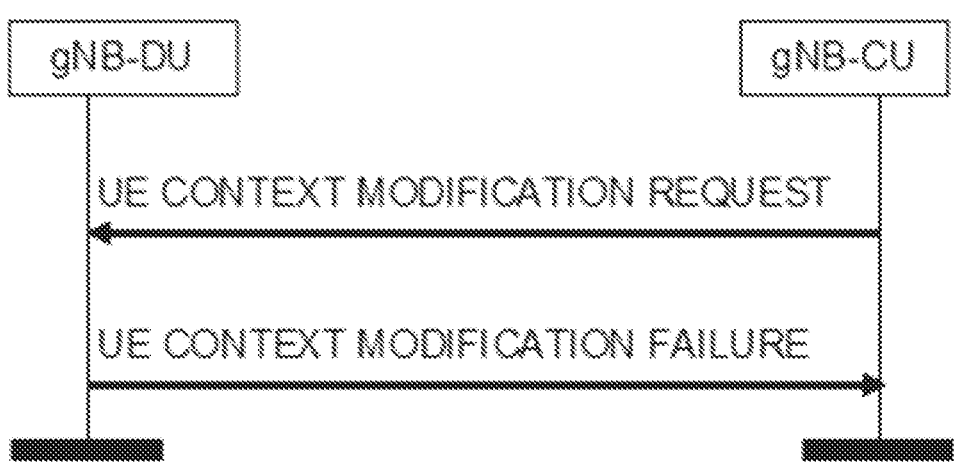
FIG. 3 illustrates an unsuccessful operation of a User Equipment Context Modification procedure.

FIG. 3 is FIG. 8.3.4.3-1 illustrating an unsuccessful operation of a UE Context Modification procedure.

In case none of the requested modifications of the UE context can be successfully performed, the gNB-DU shall respond with the UE CONTEXT MODIFICATION FAIL-URE message with an appropriate cause value.

If the gNB-DU is not able to accept the SpCell ID IE in UE CONTEXT MODIFICATION REQUEST message, it shall reply with the UE CONTEXT MODIFICATION FAILURE message.

8.3.4.4 Abnormal Conditions

If the gNB-DU receives a UE CONTEXT MODIFICA-TION REQUEST message containing a E-UTRAN QoS IE for a GBR QoS DRB but where the GBR QoS Information IE is not present, the gNB-DU shall report the establishment of the corresponding DRB as failed in the DRB Failed to Setup List IE of the UE CONTEXT MODIFICATION RESPONSE message with an appropriate cause value.

If the gNB-DU receives a UE CONTEXT MODIFICA-TION REQUEST message containing a DRB QoS IE for a GBR QoS DRB but where the GBR QoS Flow Information IE is not present, the gNB-DU shall report the establishment of the corresponding DRBs as failed in the DRB Failed to Setup List IE of the UE CONTEXT MODIFICATION RESPONSE message with an appropriate cause value.

If the Delay Critical IE is included in the Dynamic 5QI Descriptor IE within the DRB QoS IE in the UE CONTEXT MODIFICATION REQUESTmessage and is set to the value "delay critical" but the Maximum Data Burst Volume IE is not present, the gNB-DU shall report the establishment of the corresponding DRB as failed in the DRB Failed to Setup List IE of the of the UE CONTEXT MODIFICATION RESPONSE message with an appropriate cause value.

8.3.5 UE Context Modification Required (gNB-DU Initi-ated)

8.3.5.1 General

The purpose of the UE Context Modification Required procedure is to modify the established UE Context, e.g., modifying and releasing radio bearer resources. The proce-dure uses UE-associated signaling.

8.3.5.2 Successful Operation

Figure 4:
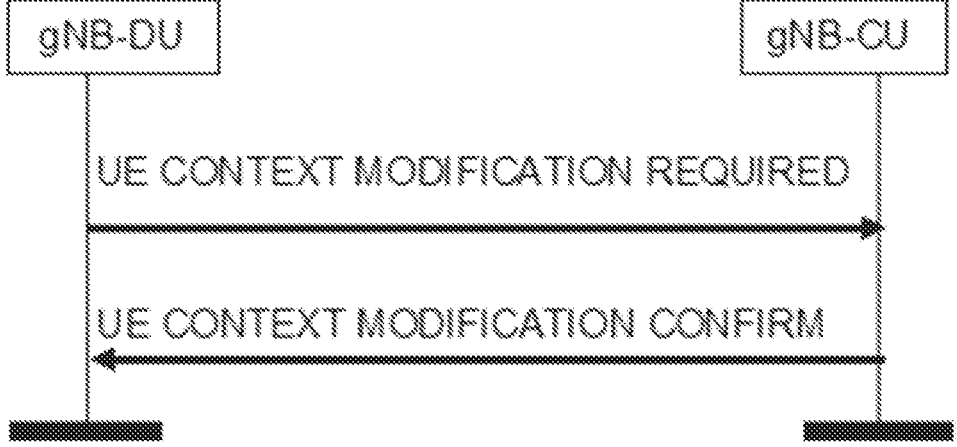
FIG. 4 illustrates a successful operation of a User Equipment Context Modification Required procedure.

FIG. 4 is FIG. 8.3.5.2-1 illustrating a successful operation of a UE Context Modification Required procedure.

The F1AP UE CONTEXT MODIFICATION REQUIRED message is initiated by the gNB-DU.

The gNB-CU reports the successful update of the UE context in the UE CONTEXT MODIFICATION CONFIRM message.

For a given bearer for which PDCP CA duplication was already configured, if two DL UP TNL Information IEs are included in UE CONTEXT MODIFICATION REQUIRED message for a DRB, the gNB-CU shall include two UL UP TNL Information IEs in UE CONTEXT MODIFICATION CONFIRM message. The gNB-CU and gNB-DU use the UL UP TNL Information IEs and DL UP TNL Information IEs to support packet duplication for intra-gNB-DU CA as defined in TS 38.470 [2], and the first UP TNL Information IE is still for the primary path.

If the Resource Coordination Transfer Container IE is included in the UE CONTEXT MODIFICATION REQUIRED, the gNB-CU shall transparently transfer this information for the purpose of resource coordination as described in TS 36.423 [9], TS 38.423 [28].

For EN-DC operation, if the gNB-CU includes the Resource Coordination Transfer Information IE in the UE CONTEXT MODIFICATION CONFIRM message, the gNB-DU shall, if supported, use it for the purpose of resource coordination. If the gNB-CU received the MeNB Resource Coordination Information as defined in TS 36.423 [9], after completion of UE Context Modification Required procedures, the gNB-CU shall transparently transfer it to the gNB-DU via the Resource Coordination Transfer Container IE in the UE CONTEXT MODIFICATION CONFIRM message. The gNB-DU shall use the information received in the Resource Coordination Transfer Container IE for recep-tion of MeNB Resource Coordination Information at the gNB acting as secondary node as described in TS 36.423 [9]. If the Resource Coordination E-UTRA Cell Information IE is included in the Resource Coordination Transfer Informa-tion IE, the gNB-DU shall store the information replacing previously received information for the same E-UTRA cell, and use the stored information for the purpose of resource coordination. If the Ignore PRACH Configuration IE is present and set to "true" the E-UTRA PRACH Configuration IE in the UE CONTEXT MODIFICATION CONFIRM message shall be ignored.

For NGEN-DC or NE-DC operation, if the gNB-CU includes the Resource Coordination Transfer Information IE in the UE CONTEXT MODIFICATION CONFIRM mes-sage, the gNB-DU shall, if supported, use it for the purpose of resource coordination. If the gNB-CU received the MR-DC Resource Coordination Information as defined in TS 38.423 [28], after completion of UE Context Modification Required procedures, the gNB-CU shall transparently trans-fer it to the gNB-DU via the Resource Coordination Transfer Container IE in the UE CONTEXT MODIFICATION CON-FIRM message. The gNB-DU shall use the information received in the Resource Coordination Transfer Container IE for reception of MR-DC Resource Coordination Information at the gNB as described in TS 38.423 [28].

If the CellGroupConfig IE is included in the DU to CU RRC Information IE contained in the UE CONTEXT MODIFICATION REQUIRED message, the gNB-CU shall perform RRC Reconfiguration as described in TS 38.331 [8]. The CellGroupConfig IE shall transparently be signaled to the UE as specified in TS 38.331 [8].

If the UE CONTEXT MODIFICATION CONFIRM mes-sage includes the Execute Duplication IE, the gNB-DU shall perform CA based duplication, if configured, for the SRB for the included RRC-Container IE.

If the UE CONTEXT MODIFICATION REQUIRED message contains the RLC Status IE, the gNB-CU shall assume that RLC has been reestablished at the gNB-DU and may trigger PDCP data recovery.

8.3.5.2A Unsuccessful Operation

Figure 5:
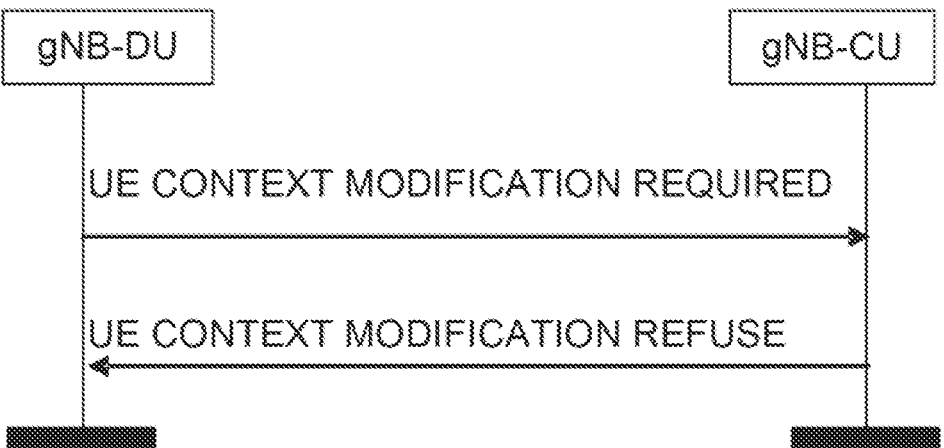
FIG. 5 illustrates an unsuccessful operation of a User Equipment Context Modification Required procedure.

FIG. 5 is FIG. 8.3.5.2A-1 illustrating an unsuccessful operation of a UE Context Modification Required procedure.

In case none of the requested modifications of the UE context can be successfully performed, the gNB-CU shall respond with the UE CONTEXT MODIFICATION REFUSE message with an appropriate cause value.

8.3.5.3 Abnormal Conditions

Not applicable.

8.4.1.1 Initial UL RRC Message Transfer 8.4.1.1 General

The purpose of the Initial UL RRC Message Transfer procedure is to transfer the initial RRC message to the gNB-CU. The procedure uses non-UE-associated signaling.

8.4.1.2 Successful Operation

Figure 6:
FIG. 6 illustrates an Initial UL RRC Message Transfer procedure.

FIG. 6 is FIG. 8.4.1.2-1 illustrating an Initial UL RRC Message Transfer procedure. The establishment of the UE-associated logical F1-connection shall be initiated as part of the procedure.

If the DU to CU RRC Container IE is not included in the INITIAL UL RRC MESSAGE TRANSFER, the gNB-CU should reject the UE under the assumption that the gNB-DU is not able to serve such UE. If the gNB-DU is able to serve the UE, the gNB-DU shall include the DU to CU RRC Container IE and the gNB-CU shall configure the UE as specified in TS 38.331 [8] and transparently include the received CellGroupConfig IE. The gNB-DU shall not include the ReconfigurationWithSync field in the CellGroupConfig IE as defined in TS 38.331 [8] of the DU to CU RRC Container IE.

If the SUL Access Indication IE is included in the INITIAL UL RRC MESSAGE TRANSFER, the gNB-CU shall consider that the UE has performed access on SUL carrier.

8.4.1.3 Abnormal Conditions

Not applicable.

8.4.2 DL RRC Message Transfer 8.4.2.1 General

The purpose of the DL RRC Message Transfer procedure is to transfer an RRC message. The procedure uses UE-associated signaling.

8.4.2.2 Successful Operation

Figure 7:
FIG. 7 illustrates a DL RRC Message Transfer procedure.

FIG. 7 is FIG. 8.4.2.2-1 illustrating a DL RRC Message Transfer procedure.

If a UE-associated logical F1-connection exists, the DL RRC MESSAGE TRANSFER message shall contain the gNB-DU UE F1AP ID IE, which should be used by gNB-DU to lookup the stored UE context. If no UE-associated logical F1-connection exists, the UE-associated logical F1-connection shall be established at reception of the DL RRC MESSAGE TRANSFER message.

If the Index to RAT/Frequency Selection Priority IE is included in the DL RRC MESSAGE TRANSFER, the gNB-DU may use it for RRM purposes.

The DL RRC MESSAGE TRANSFER message shall include, if available, the old gNB-DU UE F1AP ID IE so that the gNB-DU can retrieve the existing UE context in RRC connection reestablishment procedure, as defined in TS 38.401 [4].

The DL RRC MESSAGE TRANSFER message shall include, if SRB duplication is activated, the Execute Duplication IE, so that the gNB-DU can perform CA based duplication for the SRB.

If the gNB-DU identifies the UE-associated logical F1-connection by the gNB-DU UE F1AP ID IE in the DL RRC MESSAGE TRANSFER message and the old gNB-DU UE F1AP ID IE is included, it shall release the old gNB-DU UE F1AP ID and the related configurations associated with the old gNB-DU UE F1AP ID.

If the UE Context not retrievable IE set to "true" is included in the DL RRC MESSAGE TRANSFER, the DL RRC MESSAGE TRANSFER may contain the Redirected RRC message IE and use it as specified in TS 38.401 [4].

If the UE Context not retrievable IE set to "true" is included in the DL RRC MESSAGE TRANSFER, the DL RRC MESSAGE TRANSFER may contain the PLMN Assistance Info for Network Sharing IE, if available at the gNB-CU and may use it as specified in TS 38.401 [4].

If the DL RRC MESSAGE TRANSFER message contains the New gNB-CU UE F1AP ID IE, the gNB-DU shall, if supported, replace the value received in the gNB-CU UE F1AP ID IE by the value of the New gNB-CU UE FLAP ID and use it for further signaling.

Interactions with UE Context Release Request procedure: if the UE Context not retrievable IE set to "true" is included in the DL RRC MESSAGE TRANSFER, the gNB-DU may trigger the UE Context Release Request procedure, as specified in TS 38.401 [4].

8.4.2.3 Abnormal Conditions

Not applicable.

8.4.3 UL RRC Message Transfer 8.4.3.1 General

The purpose of the UL RRC Message Transfer procedure is to transfer an RRC message as an UL PDCP-PDU to the gNB-CU. The procedure uses UE-associated signaling.

8.4.3.2 Successful Operation

FIG. 8 is FIG. 8.4.3.2-1 illustrating a UL RRC Message Transfer procedure.

When the gNB-DU has received from the radio interface an RRC message to which a UE-associated logical F1-connection for the UE exists, the gNB-DU shall send the UPLINK RRC TRANSFER message to the gNB-CU including the RRC message as a RRC-Container IE.

If the Selected PLMN ID IE is contained in the UL RRC MESSAGE TRANSFER message, the gNB-CU may use it as specified in TS 38.401 [4].

If the UL RRC MESSAGE TRANSFER message contains the New gNB-DU UE F1AP ID IE, the gNB-CU shall, if supported, replace the value received in the gNB-DU UE F1AP ID IE by the value of the New gNB-DU UE F1AP ID and use it for further signaling.

8.4.3.3 Abnormal Conditions

Not applicable.

8.4.4 RRC Delivery Report 8.4.4.1 General

The purpose of the RRC Delivery Report procedure is to transfer to the gNB-CU information about successful delivery of DL PDCP-PDUs including RRC messages. The procedure uses UE-associated signaling.

8.4.4.2 Successful Operation

Figure 9:
FIG. 9 illustrates an RRC Delivery Report procedure.

FIG. 9 is FIG. 8.4.4.2-1 illustrating an RRC Delivery Report procedure.

When the gNB-DU has successfully delivered an RRC message to the UE for which the gNB-CU has requested a delivery report, the gNB-DU shall send the RRC DELIVERY REPORT message to the gNB-CU containing the RRC Delivery Status IE and the SRB ID IE.

8.4.4.3 Abnormal Conditions

Not applicable.

The case on a handover occurring between cells served by the same node, e.g. an intra gNB-DU handover, or the case of a handover triggered for a UE that remains in the same cell are also possible. In TS38.401 v15.6.0 the intra gNB-DU handover case is described in the following section.

8.2.1.2 Intra-gNB-DU Handover

This procedure is used for the case that UE moves from one cell to another cell within the same gNB-DU or for the case that intra-cell handover is performed during NR operation, and supported by UE Context Modification (gNB-CU initiated) procedure as specified in TS 38.473 [4]. When the intra-cell handover is performed, the gNB-CU provides new UL GTP TEID to the gNB-DU and gNB-DU provides new DL GTP TEID to the gNB-CU. The gNB-DU shall continue sending UL PDCP PDUs to the gNB-CU with the previous UL GTP TEID until it re-establishes the RLC, and use the new UL GTP TEID after RLC re-establishment. The gNB-CU shall continue sending DL PDCP PDUs to the gNB-DU with the previous DL GTP TEID until it performs PDCP re-establishment or PDCP data recovery and use the new DL GTP TEID starting with the PDCP re-establishment or data recovery.

Potential problems, or challenges, with some approaches for coordination of control plane traffic management during a communication device reconfiguration, e.g. an intra gNB-DU handover procedure, may include the following.

During an intra gNB-DU handover procedure, the gNB-CU-CP is not able to determine if an F1AP: uplink (UL) RRC Message Transfer carries an RRC message originating from the old cell or the new/target cell of the gNB-DU. Namely, the following steps are an example of how an intra gNB-DU handover may be performed:

1. gNB-CU-CP sends F1AP user equipment (UE) Context Modification Request including SpCell ID information element (IE);
2. gNB-DU prepares resources for the specified SpCell ID, builds a CellGroupConfig and returns that in F1AP UE Context Modification Response;
3. gNB-CU-CP sends F1AP UE Context Modification Request including the ReconfigurationWithSync and Transmission Stop Indicator (triggering stop of user data, DRBs);
   a. gNB-CU-CP resets UL PDCP COUNT for SRB1 to zero at this point.
4. gNB-DU delivers any UL dedicated RRC message over F1 with F1AP UL RRC Message Transfer; and
5. gNB-DU delivers the RRC message, suspends DRBs and sends F1AP UE Context Modification Response.

There is no information in F1AP UL RRC Message Transfer that informs gNB-CU-CP if an RRC message originates from old cell or the new/target cell.

a. If a PDCP COUNT larger than zero is received at the gNB-CU-CP, the tReorderingTimer is started. This could happen because an RRC message from the old cell is received at the gNB-CU-CP after the F1AP UE Context Modification Request including the ReconfigurationWithSync and Transmission Stop Indicator is sent from the gNB-CU-CP.
   b. If tReorderingTimer expires, gNB-CU-CP will (falsely) advance the UL PDCP COUNT for SRB1. Therefore, if e.g. Reconfiguration Complete with COUNT=0 arrives later (COUNT=0 because this is the first RRC message on the new cell) it will be discarded resulting in a failed handover.

As seen from the above, there may be problems, or challenges, with the packet data convergence protocol (PDCP) re-ordering functionality in gNB-CU-CP.

Potential problems, or challenges, include that there is no information in F1AP UL RRC Message Transfer that informs gNB-CU-CP if an RRC message originates from old cell or the new/target cell. The latter leads to the issue of PDCP Sequence Numbering (SN) resetting at the wrong time. Namely, the first message sent from the new/target cell shall have PDCP SN equal to zero and if a message sent from the old serving cell is received after the PDCP SN has been reset, such message (which has a SN much higher than zero) will be discarded as out of sequence.

Figure 10:
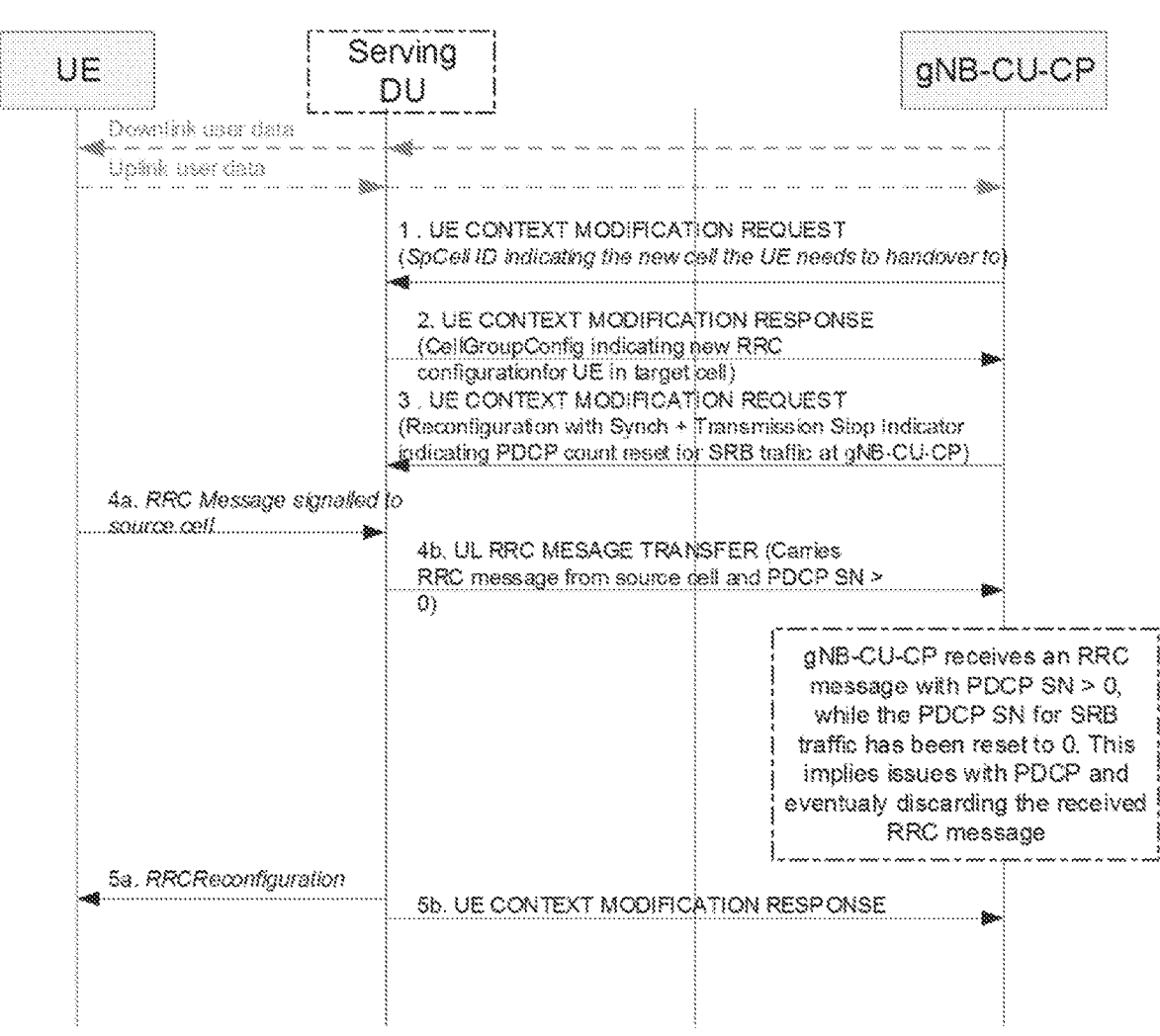
FIG. 10 is a signaling diagram illustrating.

FIG. 10 is a signaling diagram illustrating an intra gNB-DU handover procedure in 3GPP TS 38.401 v.15.6.0.

FIG. 14 illustrates a flow chart of operations that can be performed by the central unit (CU) of a network node in accordance with various embodiments for coordination of control plane traffic management during a communication device reconfiguration in a telecommunication network.

Referring to FIG. 14 the operations and associated methods include a CU receiving 1401 information from a distributed unit (DU) of a network node alerting the CU to reset a packet data convergence protocol (PDCP) sequence number of control plane traffic signaled from the communication device as a consequence of an event in the telecommunications network. Responsive to the receiving information, the method further includes resetting 1403 the PDCP sequence number of the control plane traffic signaled from the communication device.

Figure 11:
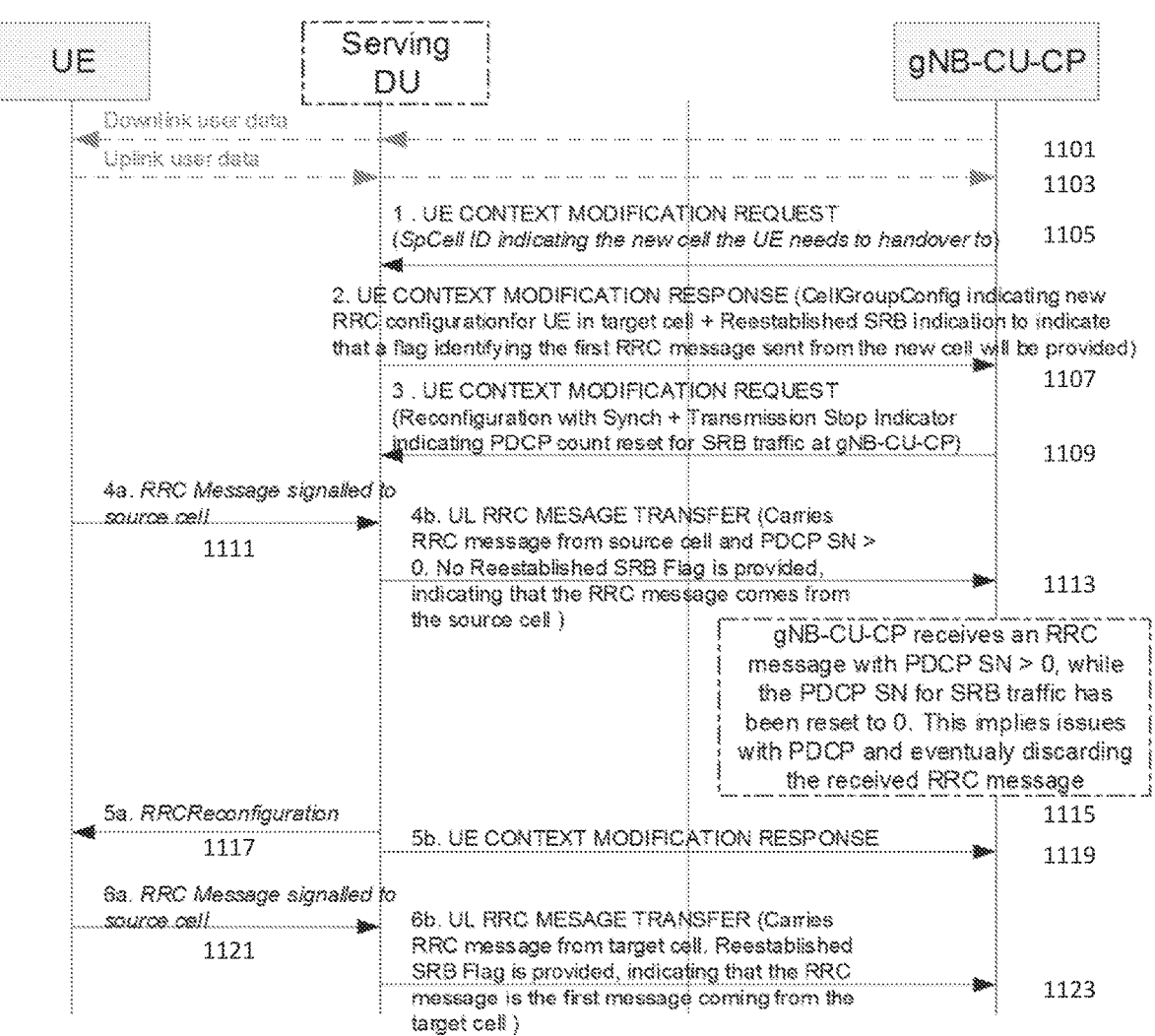
FIG. 11 is a signaling diagram illustrating a coordination of control plane traffic management according to some embodiments of inventive concepts.

In some embodiments, as illustrated, e.g., in FIG. 11 at 1123, a flag is added in F1AP UL RRC Message Transfer indicating if the RRC message is the first message sent from the handover target cell. As a result, all messages received before this flagged message are treated as messages coming from the old cell.

Until this indication is received, the SN is not re-initialized.

Accordingly, in some embodiments, the flag (re-established SRB flag) in F1AP UL RRC Message Transfer indicates if the RRC message is the "first message on a re-established SRB flow."

Corresponding embodiments by the CU to receive 1401 information from the DU can include receiving from the DU a first message including an uplink message from a target cell and an indicator that the uplink message is the first message sent from the target cell. The uplink message may include a radio resource control, RRC, message from the target cell. The indicator may include a flag indicating that the RRC message is a first message sent from the target cell. The flag may include a reestablished signaling radio bearer, SRB, flag indicating that the RRC message is the first message on a reestablished SRB flow. The first message may be received from the DU over an F1 interface. The first message may include an uplink RRC message transfer message.

In the above embodiments, a gNB-CU may not know in advance whether a gNB-DU is capable of signaling the new flag in the UL RRC Message Transfer procedure.

In some embodiments, if the gNB-DU does not support this new flag, the gNB-CU-CP will need to decide by implementation from which UL RRC message it should be assumed that the UE is communicating via the new cell (i.e. resetting PDCP SN count is done by means of implementation).

Corresponding operations by the CU to receive 1401 information from the DU can include receiving a plurality of uplink radio resource control, RRC, messages. Furthermore, the receiving 1401 information from a DU may further include deciding by implementation from which uplink RRC message from the plurality of uplink RRC messages that the UE is communicating via the target cell. Resetting the PDCP sequence number of the control plane traffic signaled from the communication device may be performed by implementation.

If the gNB-DU supports this new flag, it may signal it to the gNB-CU-CP. However, if the Re-establishment SRB Flag signaling is delayed (e.g. due to a UE signaling for a longer time on the old serving cell) the gNB-CU-CP implementation might deduce that the gNB-DU does not support the flag and for that it might reset the PDCP Count erroneously.

Potential advantages of embodiments of the present disclosure may include addressing problems, or challenges, with the PDCP re-ordering functionality related to SRBs in the gNB-CU-CP. In various embodiments, an erroneous advancement of the PDCP count may be avoided. An erroneous advancement may lead to e.g. failed intra-DU Handovers.

Corresponding operations by the CU to receive 1401 information from the DU can include receiving a first message from the DU including an uplink message from a target cell and an indicator that the uplink message is the first message sent from the target cell.

FIG. 16 illustrates a flow chart of operations that can be performed by the CU in accordance with various embodiments. The signaling the first message to the CU may include signaling the first message including an uplink message from a target cell and the indicator that the uplink message is a first message sent from the target cell.

The F1AP INITIAL UL RRC MESSAGE TRANSFER message sent may include the following, with additions in accordance with various embodiments of the present disclosure indicated with underlining.

UL RRC Message Transfer

This message is sent by the gNB-DU to transfer the layer 3 message to the gNB-CU over the F1 interface.

TABLE 1

| UL RRC Message Transfer | | | | | | |
|---|---|---|---|---|---|---|
| IE/Group Name | Presence | Range | IE type and reference | Semantics description | Criticality | Assigned Criticality |
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| SRB ID | M | | 9.3.1.7 | | YES | reject |
| RRC-Container | M | | 9.3.1.6 | Includes the UL-DCCH-Message IE as defined in subclause 6.2 of TS 38.331 [8], encapsulated in a PDCP PDU. | YES | reject |
| Selected PLMN ID | 0 | | PLMN Identity 9.3.1.14 | | YES | reject |
| New gNB-DU UE F1AP ID | 0 | | gNB-DU UE F1AP ID 9.3.1.5 | | YES | reject |
| Reestablished SRB flag | 0 | | ENUMERATED (Reestablished SRB flow, . . . ) | | YES | ignore |

Various embodiments may be introduced in a backward compatible way in a live network with upgrading of software for gNB-CU and gNB-DU separately.

Further exemplary embodiments of the present disclosure described below. While some exemplary embodiments describe intra-DU handovers (HO), embodiments of the present disclosure are not so limited and include, without limitation, coordination of control plan traffic management during communication with a communication device.

In some embodiments, an event in the telecommunications network may include an intra gNB-DU handover.

In the F1AP INITIAL UL RRC MESSAGE TRANSFER message a flag, the Reestablished SRB flag, is included indicating if the RRC message is the first message sent from the handover target cell.

Accordingly, in some embodiments, a first message includes an uplink RRC message transfer message as illustrated, e.g., at 1123 in FIG. 11.

In some embodiments, the indicator includes a flag indicating that the RRC message is the first message sent from the target cell as illustrated, e.g., at 1123 in FIG. 11.

Accordingly, in some embodiments, the first message is received from the DU over an F1 interface, and the first message is signaled by the DU to the CU over an F1 interface.

Direction: gNB-DU→gNB-CU

As illustrated in the underlined portion of Table 1, in some embodiments, the flag includes a reestablished signaling radio bearer, SRB, flag indicating that the RRC message is the first message on a reestablished SRB flow.

As described above, however, the gNB-CU-CP involved in an intra-DU HO may not know in advance whether a gNB-DU is capable of signaling the flag in the UL RRC Message Transfer procedure.

An inability of the gNB-CU-CP to signal the flag might lead eventually to the possibility of resetting the PDCP Count erroneously.

If the gNB-DU does not support this new flag, the gNB-CU-CP will need to decide by implementation from which UL RRC message onwards it should be assumed that the UE is communicating via the new cell (in other words, resetting PDCP count is done by means of implementation).

Accordingly, in some embodiments, corresponding operations by the CU to receive 1401 information from a DU can include receiving a plurality of uplink radio resource control, RRC, messages. Furthermore, the receiving 1401 information from a DU may further include deciding by implementation from which uplink RRC message from the plurality of uplink RRC messages that the UE is communicating via the target cell. Resetting the PDCP sequence number of the control plane traffic signaled from the communication device may be performed by implementation.

Referring to FIG. 14, in some embodiments, corresponding operations by the CU for resetting 1403 include signaling to the CU a plurality of uplink radio resource control, RRC, messages. One of the plurality of uplink RRC messages may include a communication from the communication device via the target cell.

If the gNB-DU supports the flag, it may signal the flag to the gNB-CU-CP.

FIG. 16 illustrates a flow chart of corresponding operations that can be performed by a CU in accordance with some embodiments. Referring to FIG. 16, the operations and associated methods include receiving 1601 from the DU a second message including an indication that DU supports sending a message that includes the indicator. Operations and methods further include, responsive to receiving the second message, waiting (1603) to reset the PDCP sequence number of the control plane traffic signaled from the UE until the CU receives the first message containing the indicator.

FIG. 17 illustrates a flow chart of corresponding operations that can be performed by a DU in accordance with some embodiments. In some embodiments, signaling (1705) to the CU a second message includes an indication that DU supports sending a message that includes the indicator. However, if the Re-established SRB Flag signaling is delayed (e.g. due to a UE signaling for a longer time on the old serving cell) the gNB-CU implementation might deduce that the gNB-DU does not support the flag and for that it might reset the PDCP Count erroneously.

To avoid this, an indicator is included in the UE CONTEXT MODIFICATION RESPONSE message as illustrated at 1119 of FIG. 11. Accordingly, in some embodiments, the second message includes a UE context modification response. Accordingly, the Reestablished SRB indicator, denotes to the CU if the gNB-DU supports the Reestablished SRB Flag IE. Accordingly, in some embodiments, the indication including a reestablished signal radio bearer, SRB, indicator indicates that the DU supports the SRB flag. By that the CU can rely on this indication and wait to reset the PDCP SN when the UL RRC Message Transfer is received with the Reestablished SRB flag. The UE CONTEXT MODIFICATION RESPONSE message received is the following.

UE Context Modification Response

This message is sent by the gNB-DU to confirm the modification of a UE context, with an indication in accordance with various embodiments shown with underlining.

Direction: gNB-DU→gNB-CU.

TABLE 2

| IE/Group Name | Presence | Range | IE type and reference | Semantics description | Critical-ity | Assigned Critical-ity |
|---|---|---|---|---|---|---|
| | | | UE Context Modification Response | | | |
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Resource Coordination Transfer Container | O | | OCTET STRING | Includes the SgNB Resource Coordination Information IE as defined in subclause 9.2.117 of TS 36.423 [9] for EN-DC case or MR-DC Resource Coordination Information IE as defined in TS 38.423 [28] for NGEN-DC and NE-DC cases. | YES | ignore |
| DU To CU RRC Information | O | | 9.3.1.26 | | YES | reject |
| DRB Setup List | | 0 . . . 1 | | The List of DRBs which are successfully established. | YES | ignore |
| >DRB Setup Item IEs | | 1 . . . <maxnoofDRBs> | | | EACH | ignore |
| >>DRB ID | M | | 9.3.1.8 | | — | |
| >>LCID | O | | 9.3.1.35 | LCID for primary path if PDCP duplication is applied | — | |
| >>DL UP TNL | | 1 | | | — | |

TABLE 2-continued

UE Context Modification Response

| IE/Group Name | Presence | Range | IE type and reference | Semantics description | Critical-ity | Assigned Critical-ity |
|---|---|---|---|---|---|---|
| Information to be setup List |  |  |  |  |  |  |
| >>>>DL UP TNL Information to Be Setup Item IEs |  | 1 . . . <maxnoofDL UPTNLInformation> |  |  | — |  |
| >>>>DL UP TNL Information | M |  | UP Transport Layer Information 9.3.2.1 | gNB-DU endpoint of the F1 transport bearer. For delivery of DL PDUs. | — |  |
| DRB Modified List |  | 0 . . . 1 |  | The List of DRBs which are successfully modified. | YES | ignore |
| >DRB Modified Item IEs |  | 1 . . . <maxnoofDRBs> |  |  | EACH | ignore |
| >>DRB ID | M |  | 9.3.1.8 |  | — |  |
| >>LCID | O |  | 9.3.1.35 | LCID for primary path if PDCP duplication is applied | — |  |
| >>DL UP TNL Information to be setup List |  | 1 |  |  | — |  |
| >>DL UP TNL Information to Be Setup Item IEs |  | 1 . . . <maxnoofDL UPTNLInformation> |  |  | — |  |
| >>>>DL UP TNL Information | M |  | UP Transport Layer Information 9.3.2.1 | gNB-DU endpoint of the F1 transport bearer. For delivery of DL PDUs. | — |  |
| >>RLC Status | O |  | 9.3.1.69 | Indicates the RLC has been re-established at the gNB-DU. | YES | ignore |
| SRB Failed to be Setup List |  | 0 . . . 1 |  | The List of SRBs which are failed to be established. | YES | ignore |
| >SRB Failed to be Setup Item IEs |  | 1 . . . <maxnoofSRBs> |  |  | EACH | ignore |
| >>SRB ID | M |  | 9.3.1.7 |  | — |  |
| >>Cause | O |  | 9.3.1.2 |  | — |  |
| DRB Failed to be Setup List |  | 0 . . . 1 |  | The List of DRBs which are failed to be setup. | YES | ignore |
| >DRB Failed to be Setup Item IEs |  | 1 . . . <maxnoofDRBs> |  |  | EACH | ignore |
| >>DRB ID | M |  | 9.3.1.8 |  | — |  |
| >>Cause | O |  | 9.3.1.2 |  | — |  |
| SCell Failed To Setup List |  | 0 . . . 1 |  |  | YES | ignore |
| >SCell Failed to Setup Item |  | 1 . . . <maxnoofSCells> |  |  | EACH | ignore |
| >>SCell ID | M |  | NR CGI 9.3.1.12 | SCell Identifier in gNB | — |  |
| >>Cause | O |  | 9.3.1.2 |  | — |  |
| DRB Failed to be Modified List |  | 0 . . . 1 |  | The List of DRBs which are failed to be modified. | YES | ignore |
| >DRB Failed to be Modified Item IEs |  | 1 . . . <maxnoofDRBs> |  |  | EACH | ignore |
| >>DRB ID | M |  | 9.3.1.8 |  | — |  |
| >>Cause | O |  | 9.3.1.2 |  | — |  |
| Inactivity Monitoring Response | O |  | ENUMERATED (Not-supported, . . . ) |  | YES | reject |
| Criticality Diagnostics | O |  | 9.3.1.3 |  | YES | ignore |

TABLE 2-continued

| | | | | | | |
|---|---|---|---|---|---|---|
| | | | UE Context Modification Response | | | |
| IE/Group Name | Presence | Range | IE type and reference | Semantics description | Critical-ity | Assigned Critical-ity |
| C-RNTI | O | | 9.3.1.32 | C-RNTI allocated at the gNB-DU | YES | ignore |
| Associated SCell List | O | | 9.3.1.77 | | YES | ignore |
| SRB Setup List | | 0 . . . 1 | | | YES | ignore |
| >SRB Setup Item | | 1 . . . \<maxnoofSRBs\> | | | EACH | ignore |
| >>SRB ID | M | | 9.3.1.7 | | — | |
| >>LCID | M | | 9.3.1.35 | LCID for the primary path if PDCP duplication is applied | | |
| SRB Modified List | | 0 . . . 1 | | | YES | ignore |
| >SRB Modified Item | | 1 . . . \<maxnoofSRBs\> | | | EACH | ignore |
| >>SRB ID | M | | 9.3.1.7 | | — | |
| >>LCID | M | | 9.3.1.35 | LCID for the primary path if PDCP duplication is applied | — | |
| Full Configuration | O | | ENUMERATED (full, . . . ) | | YES | reject |
| Reestablished SRB indication | O | | ENUMERATED (true, . . . ) | | YES | ignore |

Corresponding operations by the CU to receive 1601 information from the DU can include receiving from the DU a second message including an indication that DU supports sending a message that includes the indicator. Corresponding further operations by the CU, responsive to receiving the second message, include waiting 1603 to reset the PDCP sequence number of the control plane traffic signaled from the UE until the CU receives the first message containing the indicator. In some embodiments, the second message includes a UE context modification response.

As illustrated in the underlined portion of Table 2 above, in some embodiments, the indication is a reestablished signal radio bearer, SRB, indicator indicating that the DU supports the SRB flag.

As described above, the gNB-CU-CP involved in this intra-DU HO does not know in advance whether a gNB-DU is capable of signaling the new flag in the UL RRC Message Transfer procedure.

This inability of the gNB-CU-CP might lead eventually to the possibility of resetting the PDCP Count erroneously.

If the gNB-DU does not support this new flag, the gNB-CU-CP may need to decide by implementation from which UL RRC message onwards it should be assumed that the UE is communicating via the new cell (i.e. resetting PDCP count is done by means of implementation).

If the gNB-DU supports this new flag, it will signal it to the gNB-CU-CP. However, if the Re-established SRB Flag signaling is delayed (e.g. due to a UE signaling for a longer time on the old serving cell) the gNB-CU implementation might deduce that the gNB-DU does not support the flag and for that it might reset the PDCP Count erroneously.

To avoid this, as described above in various embodiments, an indicator may be included in the UE CONTEXT MODI-FICATION RESPONSE message. The Reestablished SRB indicator, denotes to the CU if the gNB-DU supports the Reestablished SRB Flag IE. By that the CU can rely on this indication and wait to reset the PDCP SN when the UL RRC Message Transfer is received with the Reestablished SRB flag. The UE CONTEXT MODIFICATION RESPONSE message received may be the following with an indication of various embodiments shown with highlighting.

UE Context Modification Response

This message is sent by the gNB-DU to confirm the modification of a UE context.

Direction: gNB-DU→gNB-CU

TABLE 3

| | | | | | | |
|---|---|---|---|---|---|---|
| | | | UE Context Modification Response | | | |
| IE/Group Name | Presence | Range | IE type and reference | Semantics description | Criticality | Assigned Criticality |
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| Resource Coordination Transfer Container | O | | OCTET STRING | Includes the SgNB Resource Coordination Information IE as defined in subclause | YES | ignore |

TABLE 3-continued

| | | | | | | |
|---|---|---|---|---|---|---|
| | | UE Context Modification Response | | | | |
| | | | | 9.2.117 of TS 36.423 [9] for EN-DC case or MR-DC Resource Coordination Information IE as defined in TS 38.423 [28] for NGEN-DC and NE-DC cases. | | |
| DU To CU RRC Information | O | | 9.3.1.26 | | YES | reject |
| DRB Setup List | | 0 . . . 1 | | The List of DRBs which are successfully established. | YES | ignore |
| >DRB Setup Item IEs | | 1 . . . <maxnoofDRBs> | | | EACH | ignore |
| >>DRB ID | M | | 9.3.1.8 | | — | |
| >>LCID | O | | 9.3.1.35 | LCID for primary path if PDCP duplication is applied | — | |
| >>DL UP TNL Information to be setup List | | 1 | | | — | |
| >>>DL UP TNL Information to Be Setup Item IEs | | 1 . . . <maxnoofDL UPTNLInformation> | | | — | |
| >>>>DL UP TNL Information | M | | UP Transport Layer Information 9.3.2.1 | gNB-DU endpoint of the F1 transport bearer. For delivery of DL PDUs. | — | |
| DRB Modified List | | 0 . . . 1 | | The List of DRBs which are successfully modified. | YES | ignore |
| >DRB Modified Item IEs | | 1 . . . <maxnoofDRBs> | | | EACH | ignore |
| >>DRB ID | M | | 9.3.1.8 | | — | |
| >>LCID | O | | 9.3.1.35 | LCID for primary path if PDCP duplication is applied | — | |
| >>DL UP TNL Information to be setup List | | 1 | | | — | |
| >>>DL UP TNL Information to Be Setup Item IEs | | 1 . . . <maxnoofDL UPTNLInformation> | | | — | |
| >>>>DL UP TNL Information | M | | UP Transport Layer Information 9.3.2.1 | gNB-DU endpoint of the F1 transport bearer. For delivery of DL PDUs. | — | |
| >>RLC Status | O | | 9.3.1.69 | Indicates the RLC has been re-established at the gNB-DU. | YES | ignore |
| SRB Failed to be Setup List | | 0 . . . 1 | | The List of SRBs which are failed to be established. | YES | ignore |
| >SRB Failed to be Setup Item IEs | | 1 . . . <maxnoofSRBs> | | | EACH | ignore |
| >>SRB ID | M | | 9.3.1.7 | | — | |

TABLE 3-continued

| UE Context Modification Response | | | | | | |
|---|---|---|---|---|---|---|
| >>Cause | O | | 9.3.1.2 | | — | |
| DRB Failed to be Setup List | | 0 . . . 1 | | The List of DRBs which are failed to be setup. | YES | ignore |
| >DRB Failed to be Setup Item IEs | | 1 . . . <maxnoofDRBs> | | | EACH | ignore |
| >>DRB ID | M | | 9.3.1.8 | | — | |
| >>Cause | O | | 9.3.1.2 | | — | |
| SCell Failed To Setup List | | 0 . . . 1 | | | YES | ignore |
| >SCell Failed to Setup Item | | 1 . . . <maxnoofSCells> | | | EACH | ignore |
| >>SCell ID | M | | NR CGI 9.3.1.12 | SCell Identifier in gNB | — | |
| >>Cause | O | | 9.3.1.2 | | — | |
| DRB Failed to be Modified List | | 0 . . . 1 | | The List of DRBs which are failed to be modified. | YES | ignore |
| >DRB Failed to be Modified Item IEs | | 1 . . . <maxnoofDRBs> | | | EACH | ignore |
| >>DRB ID | M | | 9.3.1.8 | | — | |
| >>Cause | O | | 9.3.1.2 | | — | |
| Inactivity Monitoring Response | O | | ENUMERATED (Not-supported, . . . ) | | YES | reject |
| Criticality Diagnostics | O | | 9.3.1.3 | | YES | ignore |
| C-RNTI | O | | 9.3.1.32 | C-RNTI allocated at the gNB-DU | YES | ignore |
| Associated SCell List | O | | 9.3.1.77 | | YES | ignore |
| SRB Setup List | | 0 . . . 1 | | | YES | ignore |
| >SRB Setup Item | | 1 . . . <maxnoofSRBs> | | | EACH | ignore |
| >>SRB ID | M | | 9.3.1.7 | | — | |
| >>LCID | M | | 9.3.1.35 | LCID for the primary path if PDCP duplication is applied | — | |
| SRB Modified List | | 0 . . . 1 | | | YES | ignore |
| >SRB Modified Item | | 1 . . . <maxnoofSRBs> | | | EACH | ignore |
| >>SRB ID | M | | 9.3.1.7 | | — | |
| >>LCID | M | | 9.3.1.35 | LCID for the primary path if PDCP duplication is applied | — | |
| Full Configuration | O | | ENUMERATED (full, . . . ) | | YES | reject |
| Reestablished SRB indication | O | | ENUMERATED (true, . . . ) | | YES | ignore |

| Range bound | Explanation |
|---|---|
| maxnoofSRBs | Maximum no. of SRB allowed towards one UE, the maximum value is 8. |
| maxnoofDRBs | Maximum no. of DRB allowed towards one UE, the maximum value is 64. |
| maxnoofDLUPTNLInformation | Maximum no. of DL UP TNL Information allowed towards one DRB, the maximum value is 2. |
| maxnoofSCells | Maximum no. of SCells allowed towards one UE, the maximum value is 32. |

As shown in the underlined portion of Table 3 above, in some embodiments, the indication is a reestablished signal radio bearer, SRB, indicator indicating that the DU supports the SRB flag.

FIG. 11 illustrates a UE Context Modification Response at 1119.

It is understood that a person skilled in the art would understand that the methods described above include a technique to instruct a node in charge of control plane signaling and in charge of detection of in sequence delivery of control plane (CP) packets and detection of CP packet losses to understand at what point in time the sequence number of CP traffic signaled from a UE should be reset as a consequence of an event that implies such reset, such as an intra gNB-DU Handover.

Various embodiments may reuse existing signaling messages over open interfaces such as the F1AP, or derive new signaling procedures over such interfaces to convey the information described. Further, various embodiments may apply either to the signaling of information (e.g. an Re-establishment SRB Flag and a Re-establishment SRB Indication) by using the IEs underlined as in the tables above or new procedures or by reusing existing IEs for which the receiving node understands that the IEs indicate information about the timing of SN resetting for CP traffic.

In summary, in various embodiments, a gNB-DU may inform a gNB-CU when a first UL RRC message has been received in a new/target cell in case of intra-DU handover. The gNB-CU can then accurately reset PDCP SN.

For a gNB-CU to know in advance if the gNB-DU supports this, in various embodiments, the gNB-DU may inform this as part of a F1AP UE Context Modification procedure taking place during intra-DU handover.

Figure 12:
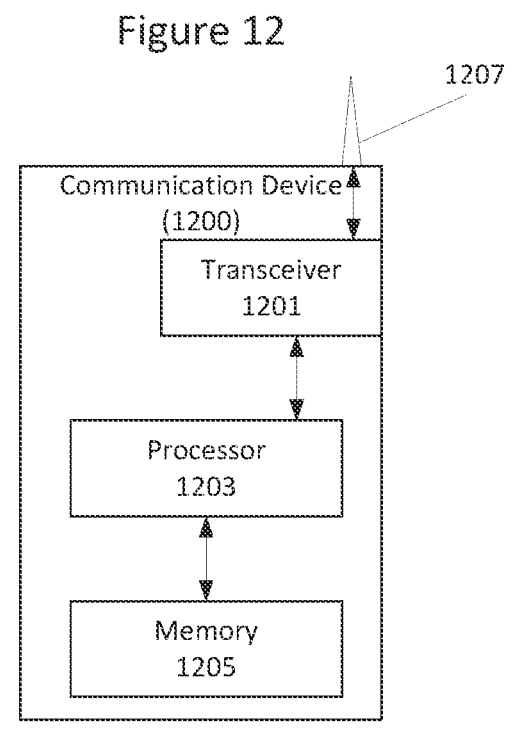

FIG. 12 is a block diagram illustrating elements of a communication device 1200 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Communication device 1200 may be provided, for example, as discussed below with respect to wireless device 1810 of FIG. 18.) As shown, communication device may include an antenna 1207 (e.g., corresponding to antenna 1811 of FIG. 18), and transceiver circuitry 1201 (also referred to as a transceiver, e.g., corresponding to interface 1814 of FIG. 18) including a transmitter and a receiver configured to provide uplink and downlink radio communications with a base station(s) (e.g., corresponding to network node 1860 of FIG. 18) of a radio access network. Communication device UE may also include processing circuitry 1203 (also referred to as a processor, e.g., corresponding to processing circuitry 1820 of FIG. 18) coupled to the transceiver circuitry, and memory circuitry 1205 (also referred to as memory, e.g., corresponding to device readable medium 1830 of FIG. 18) coupled to the processing circuitry. The memory circuitry 1205 may include computer readable program code that when executed by the processing circuitry 1205 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 1203, and/or wireless device UE may be incorporated in a vehicle.

As discussed herein, operations of communication device may be performed by processing circuitry 1203 and/or transceiver circuitry 1201. For example, processing circuitry 303 may control transceiver circuitry 1201 to transmit communications through transceiver circuitry 1201 over a radio interface to a radio access network node (also referred to as a base station) and/or to receive communications through transceiver circuitry 1201 from a RAN node over a radio interface. Moreover, modules may be stored in memory circuitry 1205, and these modules may provide instructions so that when instructions of a module are executed by processing circuitry 1203, processing circuitry 1203 performs respective operations (e.g., operations discussed below with respect to Example Embodiments relating to wireless devices).

Figure 13:
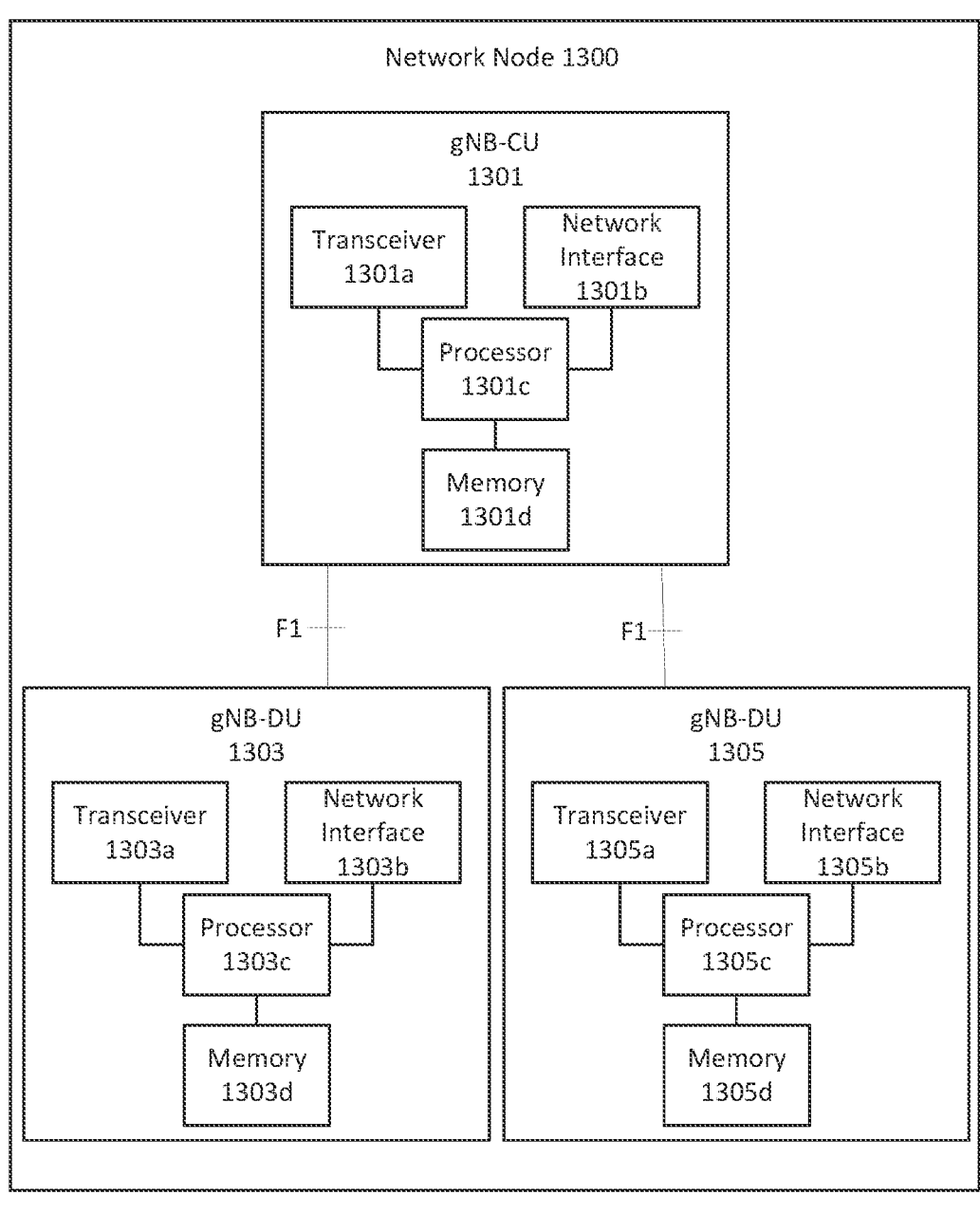
FIG. 13 is a block diagram illustrating a network node (e.g., a gNB) according to some embodiments of inventive concepts.

FIG. 13 is a block diagram illustrating a network node 1300 (e.g., a base station, eNB, gNB, etc.) of a telecommunications network. The network node 1300 includes a gNB-CU 1301 having a transceiver 1301a, a network interface 1301b, a processor circuit 1301c, and a memory 1301d. Network node 1300 also includes gNB-DU 1303 and gNB-DU 1305, which are each connected to gNB-CU 1301 via F1 interfaces. Each gNB-DU 1303, 1305 includes processor circuits 1303c and 1305c, respectively, (also referred to as at least one processor); and memory circuits 1303d and 1305d, respectively (also referred to as memory). Each gNB-DU 1303, 1305 also includes a network interface 1303b and 1305b, respectively (e.g., wired network interface and/or wireless network interface) configured to communicate with other network nodes or communication devices. Each unit 1301, 1303, 1305 of the network node 1300 may be configured to contain transceivers 1301a, 1303a, and 1305a, respectively, with one or more power amplifiers that transmit and receive through antennas of an antenna array (not shown). The memories 1301d, 1303d, and 1305d store computer readable program code that when executed by the processor circuits 1301c, 1303c, and 1305c causes the processor circuits 1301c, 1303c, and 1305c to perform operations according to embodiments disclosed herein.

According to some other embodiments, a network node may be implemented as a core network node without a transceiver. In such embodiments, transmission to a communication device may be initiated by the network node so that transmission to the communication device is provided through a network node including a transceiver (e.g., through a base station or radio access network (RAN)) node). According to embodiments where the network node is a RAN node including a transceiver, initiating transmission may include transmitting through the transceiver.

FIG. 13 is a block diagram illustrating elements of a network node 1300 (also referred to as a base station, eNodeB/eNB, gNodeB/gNB, etc.) of a Radio Access Network (RAN) configured to provide cellular communication according to embodiments of inventive concepts. (Network node 1300 may be provided, for example, as discussed below with respect to network node 1860 of FIG. 18.) As shown, the network node may include gNB-CU 1301 having transceiver circuitry 1201a (also referred to as a transceiver, e.g., corresponding to portions of interface 1890 of FIG. 18) including a transmitter and a receiver configured to provide uplink and downlink radio communications with mobile terminals. The gNB-CU 1301 may include network interface circuitry 1301b (also referred to as a network interface, e.g., corresponding to portions of interface 1890 of FIG. 18) configured to provide communications with other nodes (e.g., with other base stations) of the network and/or core network CN. The gNB-CU 1301 may also include a processing circuitry 1301c (also referred to as a processor, e.g., corresponding to processing circuitry 1870) coupled to the transceiver circuitry, and a memory circuitry 1301d (also referred to as memory, e.g., corresponding to device readable medium 1880 of FIG. 18) coupled to the processing circuitry. The memory circuitry 1301d may include computer readable program code that when executed by the processing circuitry 1301c causes the processing circuitry to perform operations according to embodiments disclosed herein. According to other embodiments, processing circuitry 1301c may be defined to include memory so that a separate memory circuitry is not required.

As discussed herein, operations of a DU1303, 1305 network node (1300) may be performed by processing circuitry 1303c, 1305c, respectively, network interface 1303b, 1305b, and/or transceiver 1303a, 1305a. For example, processing circuitry 1303c, 1305c may control transceiver 1303a, 1305a to transmit downlink communications through transceiver 1303a, 1305a over a radio interface to one or more communication devices and/or to receive uplink communications through transceiver 1303a, 1305a from one or more communication devices over a radio interface. Similarly, processing circuitry 1303c, 1305c may control network interface 1303b, 1305b to transmit communications through network interface 1303b, 1305b to one or more other network nodes and/or to receive communications through network interface from one or more other network nodes. Moreover, modules may be stored in memory 1303*d*, 1305*d*, and these modules may provide instructions so that when instructions of a module are executed by processing circuitry 1303*c*, 1305*c*, processing circuitry 1303*c*, 1305*c* performs respective operations (e.g., operations discussed below with respect to Example Embodiments relating to network nodes).

According to some other embodiments, a network node may be implemented as a core network node without a transceiver. In such embodiments, transmission to a communication device may be initiated by the network node so that transmission to the wireless device is provided through a network node including a transceiver (e.g., through a base station or RAN node). According to embodiments where the network node is a network node including a transceiver, initiating transmission may include transmitting through the transceiver.

In various embodiments, a method performed by a central unit, CU, of a network node for coordination of control plane traffic management during a communication device reconfiguration in a telecommunications network is provided. The operations and associated methods include receiving 1401 information from a distributed unit, DU, of the network node alerting the CU to reset a packet data convergence protocol, PDCP, sequence number of control plane traffic signaled from the communication device as a consequence of an event in the telecommunications network. The operations and associated methods further include resetting 1403 the PDCP sequence number of the control plane traffic signaled from the communication device responsive to the receiving information.

In some embodiments, the network node may be a gNB (e.g., 1300). In some embodiments, the communication device (e.g., 1200) may include a user equipment, UE. In some embodiments, the event may include an intra gNB-DU handover.

In various embodiments, the receiving 1401 includes receiving, (e.g., 1303, 1305) a first message including an uplink message from a target cell and an indicator that the uplink message is the first message sent from the target cell. In some embodiments, the uplink message includes a radio resource control, RRC, message from the target cell. In some embodiments, the indicator includes a flag indicating that the RRC message is a first message sent from the target cell. In some embodiments, the flag includes a reestablished signaling radio bearer, SRB, flag indicating that the RRC message is the first message on a reestablished SRB flow. In some embodiments, the first message is received from the DU (e.g. 1303, 1305) over an F1 interface. In some embodiments, the first message includes an uplink RRC message transfer message.

Referring to FIG. 15, further operations that may be performed by a CU (e.g., 1301) include the CU (e.g., 1301) decides 1501 by implementation from which uplink RRC message from the plurality of uplink RRC messages that the UE is communicating via the target cell. The resetting the PDCP sequence number of the control plane traffic signaled from the communication device may be performed by implementation.

Referring to FIG. 16, further operations that may be performed by a CU (e.g., 1301) include the CU (e.g., 1301) receiving from the DU (e.g., 1303, 1305) a second message including an indication that the DU supports sending a message that includes the indicator. Responsive to receiving the second message, the CU may wait to reset the PDCP sequence number of the control plane traffic signaled from the UE until the CU receives the first message containing the indicator.

In some embodiments, the second message includes a UE context modification response. In some embodiments, the indication includes a reestablished signal radio bearer, SRB, indicator indicating that the DU supports the SRB flag.

In various embodiments, a central unit (e.g., 1301) of a network node (e.g., 1300) may include processing circuitry (e.g., 1301*c*) and memory (e.g., 1301*d*) coupled with the processing circuitry (e.g., 1301*c*). The memory (e.g., 1301*d*) includes instructions that when executed by the processing circuitry causes the central unit to perform operations according to any methods or operations of the above embodiments. In various embodiments, a central unit of a network node is adapted to perform according to any methods or operations of the above embodiments. In various embodiments, a computer program comprising program code to be executed by processing circuitry of a central unit of a network node, whereby execution of the program code causes the central unit to perform operations according to any methods or operations of the above embodiments. In various embodiments, a computer program product comprising a non-transitory storage medium including program code to be executed by processing circuitry of a central unit of a network node, whereby execution of the program code causes the central unit to perform operations according to any methods or operations of the above embodiments.

Referring to FIG. 17, operation that can be performed by a DU (e.g. 1303, 1305) of a network node (e.g. 1300) for coordination of control plane traffic during a communication device (e.g., 1200) reconfiguration in a telecommunication network include the DU signaling 1701 a first message to a central unit, CU (e.g., 1301), of the network node include an indicator of timing of a packet data convergence protocol, PDCP, sequence number for control plane traffic signaled from the communication device for an event in the telecommunications network.

In some embodiments, the network node includes a gNB (e.g., 1300). In some embodiments, the communication device includes a user equipment, UE. In some embodiments, the event includes an intra gNB-DU handover. In some embodiments, the signaling 1701 the first message to the CU includes signaling the first message. The first message includes an uplink message from a target cell and the indicator that the uplink message is a first message sent from the target cell. In some embodiments, the uplink message includes a radio resource control, RRC, message from the target cell. In some embodiments, the indicator includes a flag indicating that the RRC message is the first message sent from the target cell. In some embodiments, the flag includes a reestablished signaling radio bearer, SRB, flag indicating that the RRC message is the first message on a reestablished SRB flow. In some embodiments, the first message is signaled by the DU to the CU over an F1 interface. In some embodiments, the first message includes an uplink RRC message transfer message.

Referring to FIG. 17, further operations of the DU (e.g., 1303, 1305) may include signaling 1703 to the CU a plurality of uplink radio resource control, RRC, messages. One of the plurality of uplink RRC messages include a communication from the communication device (e.g., 1200) via the target cell.

In some embodiments, still referring to FIG. 17, the operations of the DU (e.g. 1303, 1305) include signaling 1705 to the CU a second message including an indication that the DU supports sending a message that includes the indicator. In some embodiments, the second message is a UE context modification response. In some embodiments, the indication includes a reestablished signal radio bearer, SRB, indicator indicating that the DU supports the SRB flag.

In various embodiments, a distributed unit (e.g., 1303, 1305) of a network node (e.g., 1300) is provided. The distributed unit of a network node may include processing circuitry (e.g., 1303*d*, 1305*d*) and memory (e.g., 1303*c*, 1305*c*) coupled with the processing circuitry. The memory may include instructions that when executed by the processing circuitry causes the distributed unit of the network node to perform operations according to any methods or operations of the above embodiments. In some embodiments, a distributed unit of a network node is adapted to perform according to any methods or operations of the above embodiments. In some embodiments, a computer program may include program code to be executed by processing circuitry of a distributed unit of a network node, whereby execution of the program code causes the distributed unit of the network node to perform operations according to any methods or operations of the above embodiments. In some embodiments, a computer program product may include a non-transitory storage medium including program code to be executed by processing circuitry of a distributed unit of a network node, whereby execution of the program code causes the distributed unit of the network node to perform operations according to any methods or operations of the above embodiments.

Various operations from the flow chart of FIG. 17 may be optional with respect to some embodiments of operations performed by a DU and related methods. Regarding methods of example embodiment 23 (set forth below), for example, operations of blocks 1703 and 1705 of FIG. 17 may be optional. Regarding methods of example embodiment 29 (set forth below), for example, operations of blocks 1701 and 1705 of FIG. 17 may be optional. Regarding methods of example embodiment 30 (set forth below), for example, operations of blocks 1701 and 1703 of FIG. 17 may be optional.

The technology described throughout this disclosure thus encompasses without limitation various example embodiments, which are provided below. Reference numbers/letters are provided in parenthesis by way of example/illustration without limiting example embodiments to particular elements indicated by reference numbers/letters.

These example embodiments are discussed below.

Listing of Embodiments

1. A method performed by a central unit, CU, (1301) of a network node (1300) for coordination of control plane traffic management during a communication device (1200) reconfiguration in a telecommunications network, the method comprising:
   receiving (1401) information from a distributed unit, DU, (1303, 1305) of the network node alerting the CU to reset a packet data convergence protocol, PDCP, sequence number of control plane traffic signaled from the communication device as a consequence of an event in the telecommunications network; and
   responsive to the receiving information, resetting (1403) the PDCP sequence number of the control plane traffic signaled from the communication device.
2. The method of Embodiment 1, wherein the network node (1300) comprises a gNB.

3. The method of any of Embodiments 1 to 2, wherein the communication device (1200) comprises a user equipment, UE.
4. The method of any of Embodiments 1 to 3, wherein the event comprises an intra gNB-DU handover.
5. The method of any of Embodiments 1 to 4, wherein the receiving (1401) information from the DU of the network node alerting the CU to reset a PDCP sequence number of control plane traffic signaled from the communication device comprises:
   receiving from the DU a first message comprising an uplink message from a target cell and an indicator that the uplink message is the first message sent from the target cell.
6. The method of Embodiment 5, wherein the uplink message comprises a radio resource control, RRC, message from the target cell.
7. The method of any of Embodiments 5 to 6, wherein the indicator comprises a flag indicating that the RRC message is a first message sent from the target cell.
8. The method of Embodiment 7, wherein the flag comprises a reestablished signaling radio bearer, SRB, flag indicating that the RRC message is the first message on a reestablished SRB flow.
9. The method of any of Embodiments 5 to 8, wherein the first message is received from the DU over an F1 interface.
10. The method of any of Embodiments 5 to 9, wherein the first message comprises an uplink RRC message transfer message.
11. The method of any of Embodiments 3 to 4, wherein the receiving (1401) information from a distributed unit, DU, of the network node alerting the CU to reset a PDCP sequence number of control plane traffic signaled from the communication device comprises receiving a plurality of uplink radio resource control, RRC, messages; and
   further comprising:
      deciding (1501) by implementation from which uplink RRC message from the plurality of uplink RRC messages that the UE is communicating via the target cell; and
      wherein the resetting the PDCP sequence number of the control plane traffic signaled from the communication device is performed by implementation.
12. The method of any of Embodiments 5 to 10, further comprising:
    receiving (1601) from the DU a second message comprising an indication that the DU supports sending a message that includes the indicator; and
    responsive to receiving the second message, waiting (1603) to reset the PDCP sequence number of the control plane traffic signaled from the UE until the CU receives the first message containing the indicator.
13. The method of Embodiment 12, wherein the second message comprises a UE context modification response.
14. The method of any of Embodiments 12 to 13, wherein the indication comprises a reestablished signal radio bearer, SRB, indicator indicating that the DU supports the SRB flag.
15. A central unit (1301) of a network node (1300) comprising:
    processing circuitry (1301*c*); and
    memory (1301*d*) coupled with the processing circuitry (1301*c*), wherein the memory includes instructions that when executed by the processing circuitry causes the central unit to perform operations according to any of Embodiments 1-14.
16. A central unit (1301) of a network node (1300) adapted to perform according to any of Embodiments 1-14.

17. A computer program comprising program code to be executed by processing circuitry (1301*c*) of a central unit (1301) of a network node (1300), whereby execution of the program code causes the central unit to perform operations according to any of embodiments 1-14.

18. A computer program product comprising a non-transitory storage medium (1301*d*) including program code to be executed by processing circuitry (1301*c*) of a central unit (1301) of a network node (1300), whereby execution of the program code causes the central unit to perform operations according to any of embodiments 1-14.

19. A method performed by a distributed unit, DU, (1303, 1305) of a network node (1300) for coordination of control plane traffic management during a communication device reconfiguration in a telecommunications network, the method comprising:

signaling (1701) a first message to a central unit, CU, of the network node comprising an indicator of timing of a packet data convergence protocol, PDCP, sequence number for control plane traffic signaled from the communication device for an event in the telecommunications network.

20. The method of Embodiment 19, wherein the network node (1300) comprises a gNB.

21. The method of any of Embodiments 19 to 20, wherein the communication device (1200) comprises a user equipment, UE.

22. The method of any of Embodiments 19 to 21, wherein the event comprises an intra gNB-DU handover.

23. The method of any of Embodiments 19 to 22, wherein the signaling (1701) the first message to the CU comprises:

signaling the first message comprising an uplink message from a target cell and the indicator that the uplink message is a first message sent from the target cell.

24. The method of Embodiment 23, wherein the uplink message comprises a radio resource control, RRC, message from the target cell.

25. The method of any of Embodiments 19 to 24, wherein the indicator comprises a flag indicating that the RRC message is the first message sent from the target cell.

26. The method of Embodiment 25, wherein the flag comprises a reestablished signaling radio bearer, SRB, flag indicating that the RRC message is the first message on a reestablished SRB flow.

27. The method of any of Embodiments 19 to 26, wherein the first message is signaled by the DU to the CU over an F1 interface.

28. The method of any of Embodiments 19 to 27, wherein the first message comprises an uplink RRC message transfer message.

29. The method of any of Embodiments 19 to 24, further comprising signaling (1703) to the CU a plurality of uplink radio resource control, RRC, messages, wherein one of the plurality of uplink RRC messages comprises a communication from the communication device via the target cell.

30. The method of any of Embodiments 19 to 28, further comprising:

signaling (1705) to the CU a second message comprising an indication that the DU supports sending a message that includes the indicator.

31. The method of Embodiment 30, wherein the second message comprises a UE context modification response.

32. The method of any of Embodiments 30 to 31, wherein the indication comprises a reestablished signal radio bearer, SRB, indicator indicating that the DU supports the SRB flag.

33. A distributed unit (1303, 1305) of a network node (1300) comprising:

processing circuitry (1303*c*, 1305*c*); and
memory (1303*d*, 1305*d*) coupled with the processing circuitry (1303*c*, 1305*c*), wherein the memory includes instructions that when executed by the processing circuitry causes the distributed unit of the network node to perform operations according to any of Embodiments 19-32.

34. A distributed unit (1303, 1305) of a network node (1300) adapted to perform according to any of Embodiments 19-32.

35. A computer program comprising program code to be executed by processing circuitry (1303*c*, 1305*c*) of a distributed unit (1303, 1305) of a network node (1300), whereby execution of the program code causes the distributed unit of the network node to perform operations according to any of embodiments 19-32.

36. A computer program product comprising a non-transitory storage medium (1303*d*, 1305*d*) including program code to be executed by processing circuitry (1303*c*, 1305*c*) of a distributed unit (1303, 1305) of a network node (1300), whereby execution of the program code causes the distributed unit of the network node to perform operations according to any of embodiments 19-32.

Additional explanation of the technology described throughout this disclosure is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 18:
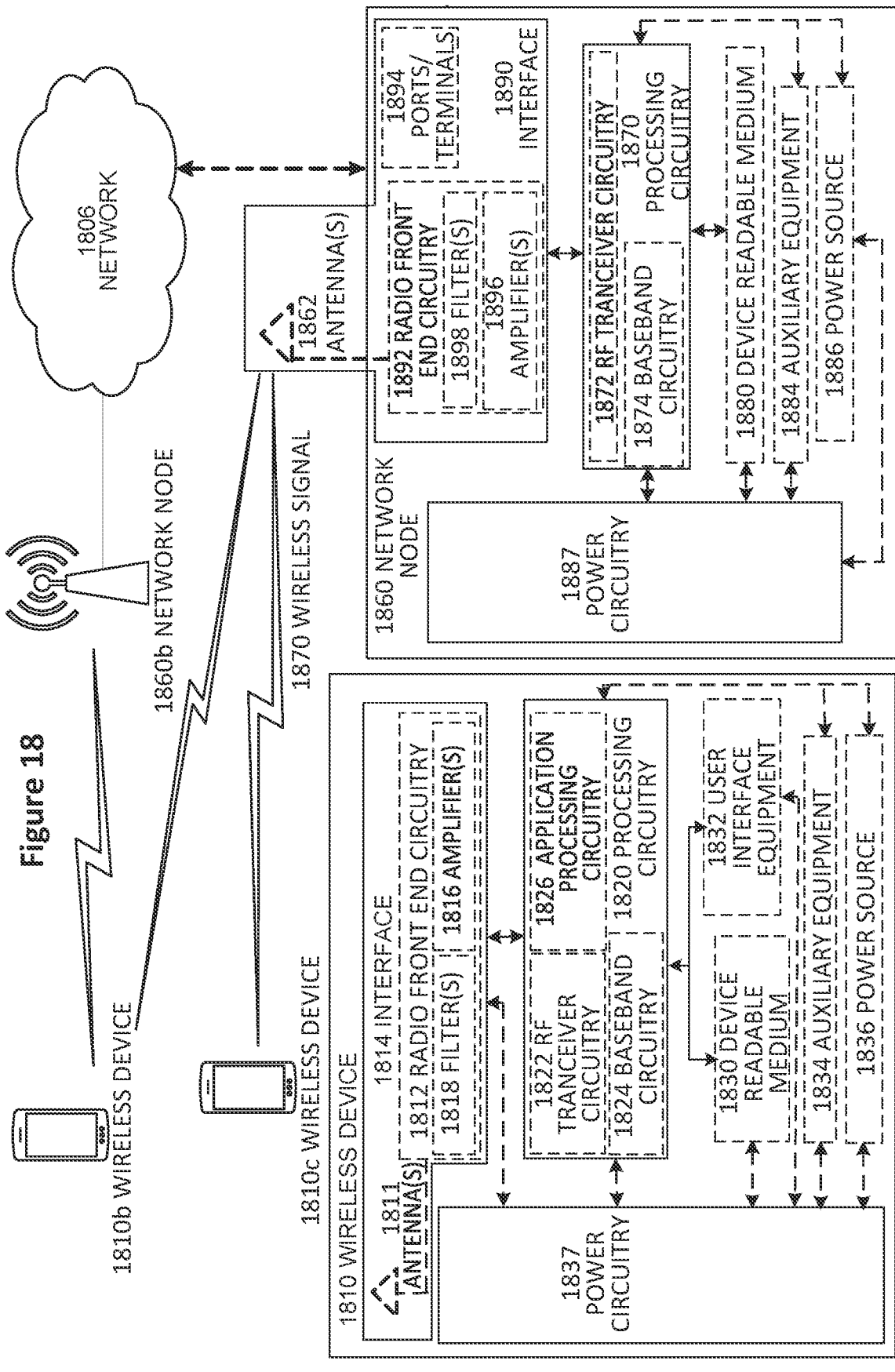
FIG. 18 is a block diagram of a wireless network in accordance with some embodiments.

FIG. 18 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 1806, network nodes 1860 and 1860*b*, and WDs 1810, 1810*b*, and 1810*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signaling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 18 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836.

Power circuitry 1837 may perform any formatting, converting, or other modification to the power from power source 1836 to make the power suitable for the respective components of WD 1810 to which power is supplied.

Figure 19:
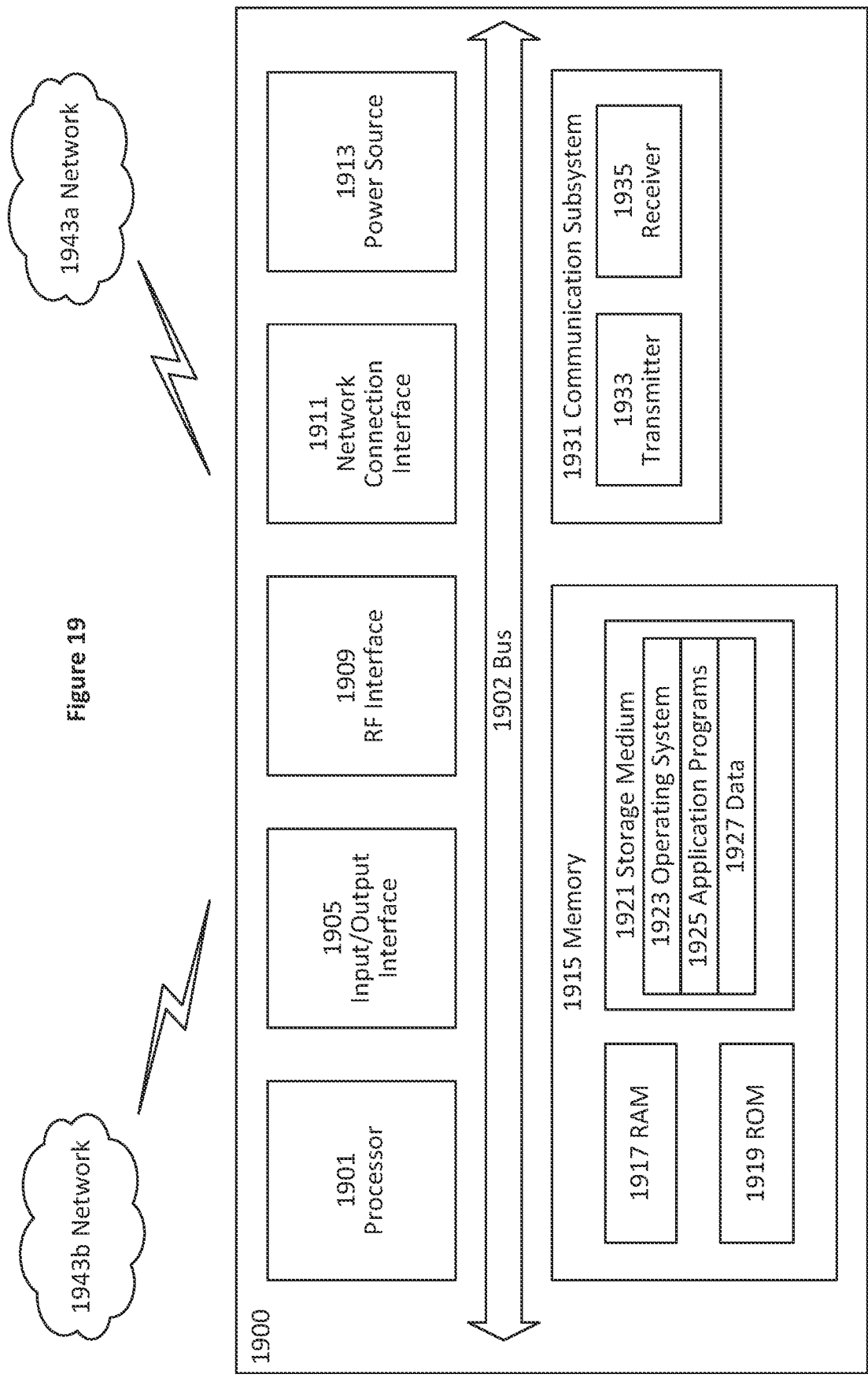
FIG. 19 is a block diagram of a user equipment in accordance with some embodiments.

FIG. 19 illustrates a user Equipment in accordance with some embodiments.

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 19200 may be any UE identified by the 3rd Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network 1943$a$. Network 1943$a$ may encompass wired and/or wireless networks such as a local-area network (LAN), a wide-area network (WAN), a computer network, a wireless network, a telecommunications network, another like network or any combination thereof. For example, network 1943$a$ may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processing circuitry 1901 may be configured to communicate with network 1943_b_ using communication subsystem 1931. Network 1943_a_ and network 1943_b_ may be the same network or networks or different network or networks. Communication subsystem 1931 may be configured to include one or more transceivers used to communicate with network 1943_b_. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.19, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943_b_ may encompass wired and/or wireless networks such as a local-area network (LAN), a wide-area network (WAN), a computer network, a wireless network, a telecommunications network, another like network or any combination thereof. For example, network 1943_b_ may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
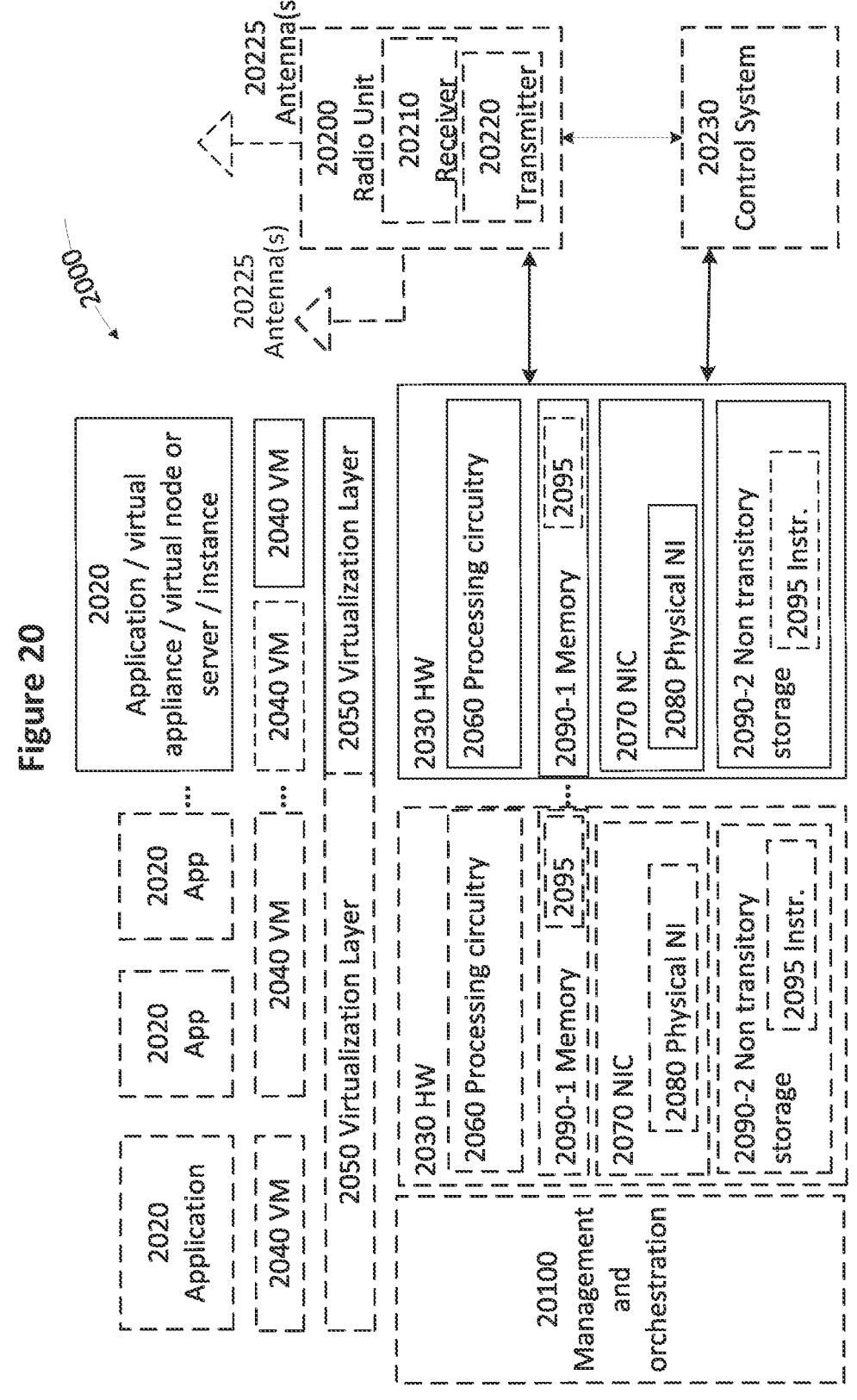
FIG. 20 is a block diagram of a virtualization environment in accordance with some embodiments.

FIG. 20 illustrates a virtualization environment in accordance with some embodiments.

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g. such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signaling can be effected with the use of control system 20230 which may alternatively be used for communication between the hardware nodes 2030 and radio units 20200.

Figure 21:
FIG. 21 is a block diagram of a telecommunication network connected via an intermediate network to a host computer in accordance with some embodiments.

FIG. 21 illustrates a telecommunication network connected via an intermediate network to a host computer in accordance with some embodiments.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112a, 2112b, 2112c, such as NBs, eNBs, gNBs or other types of wireless access points, each defining a corresponding coverage area 2113a, 2113b, 2113c. Each base station 2112a, 2112b, 2112c is connectable to core network 2114 over a wired or wireless connection 2115. A first UE 2191 located in coverage area 2113c is configured to wirelessly connect to, or be paged by, the corresponding base station 2112c. A second UE 2192 in coverage area 2113a is wirelessly connectable to the corresponding base station 2112a. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Figure 22:
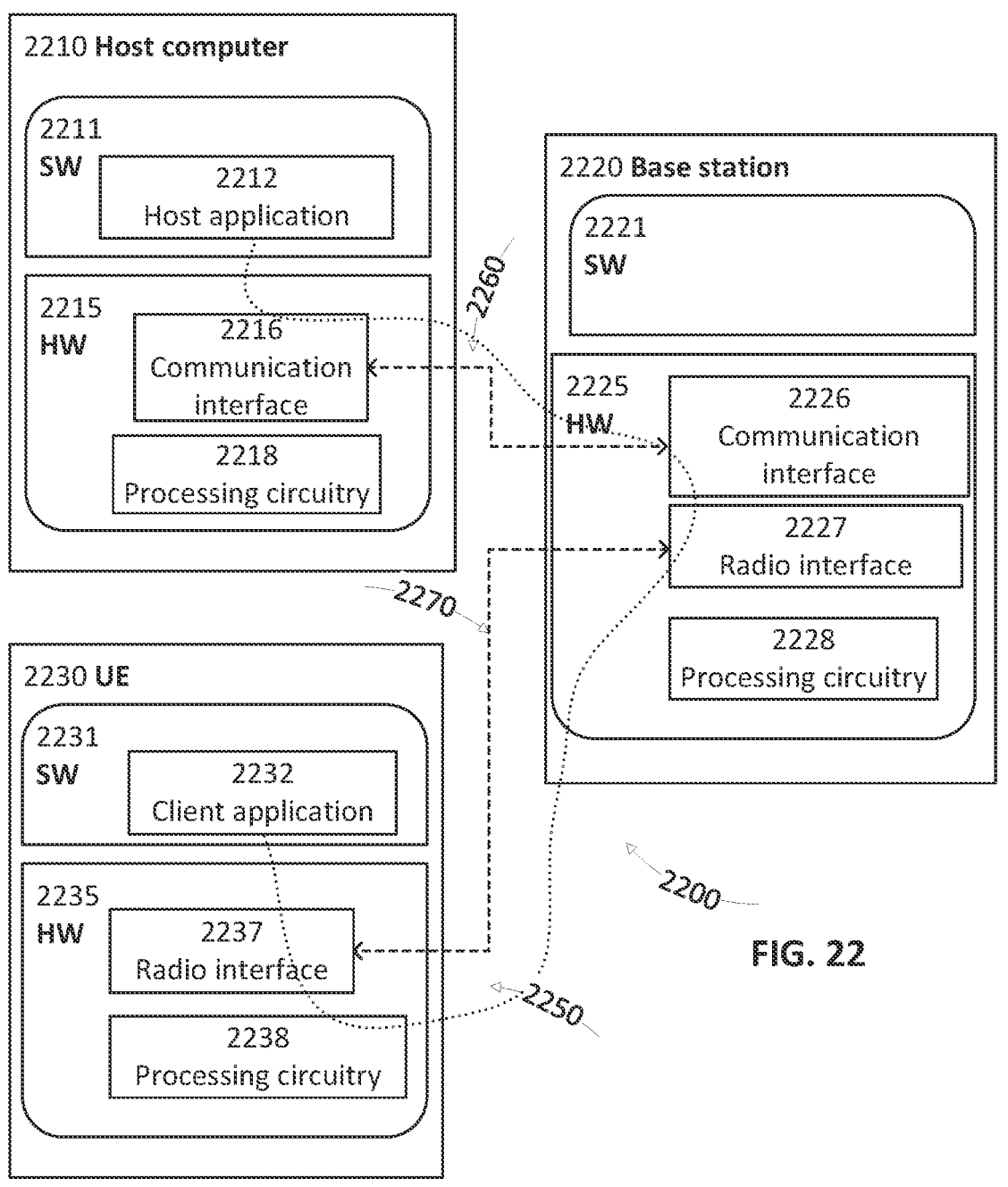
FIG. 22 is a block diagram of a host computer communicating via a base station with a user equipment over a partially wireless connection in accordance with some embodiments.

FIG. 22 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

It is noted that host computer 2210, base station 2220 and UE 2230 illustrated in FIG. 22 may be similar or identical to host computer 2130, one of base stations 2112*a*, 2112*b*, 2112*c* and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments may improve the performance of OTT services provided to UE 2230 using OTT connection 2250, in which wireless connection 2270 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
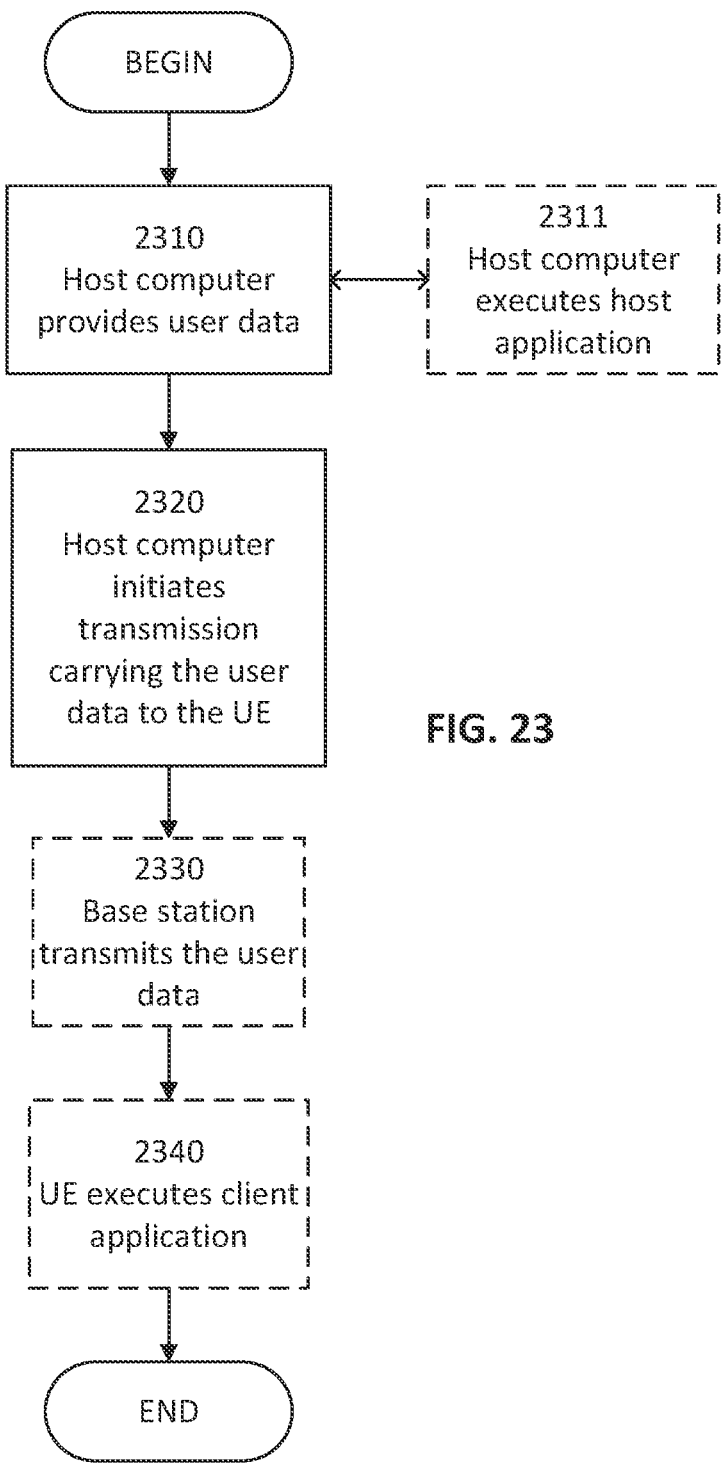
FIG. 23 is a block diagram of methods implemented in a communication system including a host computer, a base station and a user equipment in accordance with some embodiments.

FIG. 23 illustrates methods implemented in a communication system including a host computer, a base station and a user equipment in accordance with some embodiments FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
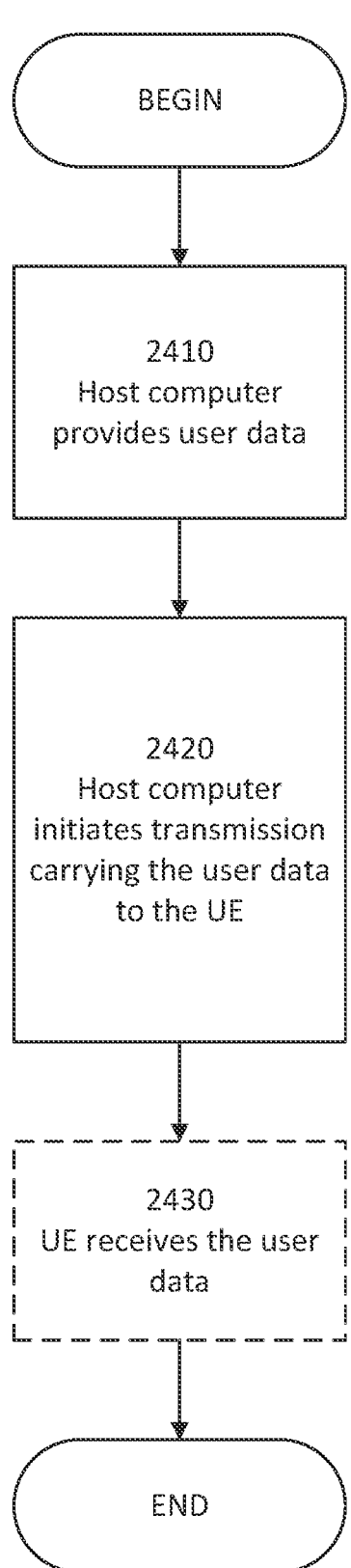
FIG. 24 is a block diagram of methods implemented in a communication system including a host computer, a base station and a user equipment in accordance with some embodiments.

FIG. 24 illustrates methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

Figure 25:
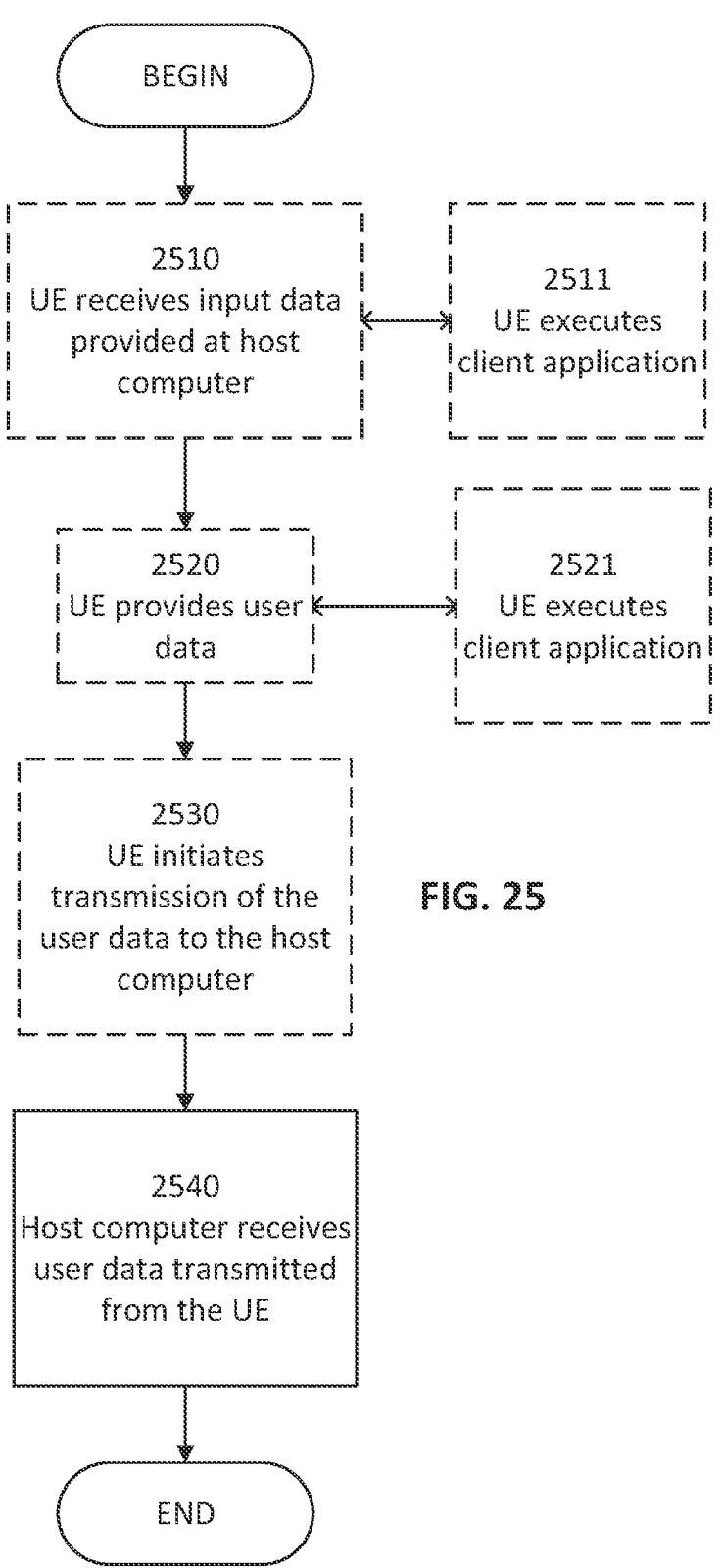
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer. In step 2540 of the method, the host computer receives the user data transmitted from the UE, in accordance with the teachings of the embodiments described throughout this disclosure.

Figure 26:
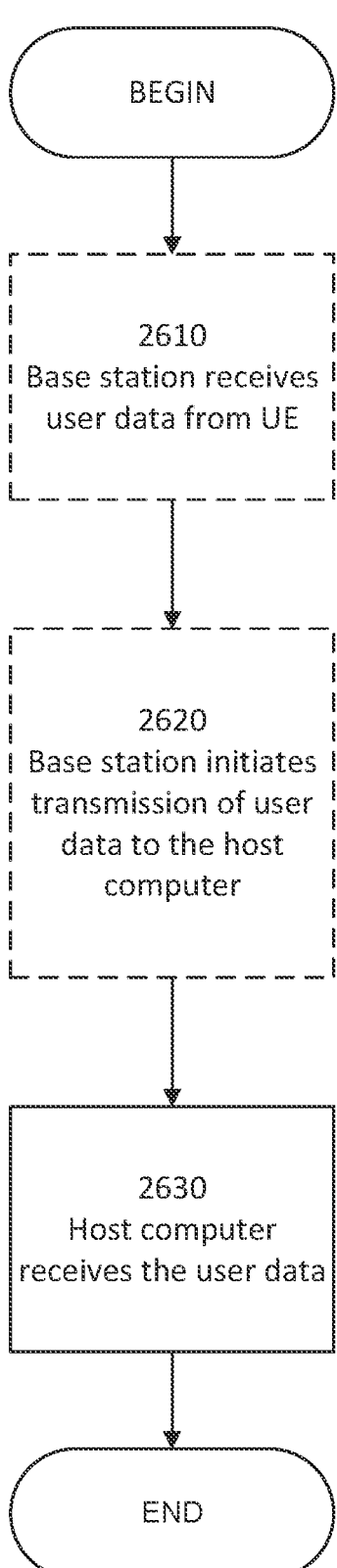
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 2610 (which may be optional), in accordance with the teachings of the embodiments described throughout this disclosure, the base station receives user data from the UE. In step 2620 (which may be optional), the base station initiates transmission of the received user data to the host computer. In step 2630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a central unit ("CU") of a source network node for coordination of control plane traffic management during a communication device reconfiguration in a telecommunications network, the method comprising:

receiving information from a distributed unit ("DU") of the source network node alerting the CU to reset a packet data convergence protocol ("PDCP") sequence number of control plane traffic signaled from the communication device as a consequence of an event in the telecommunications network; and responsive to receiving the information, resetting the PDCP sequence number of the control plane traffic signaled from the communication device, wherein receiving the information comprises receiving from the DU an uplink message from a target cell and an indicator that the uplink message is a first message sent from the target cell.

2. The method of claim 1, wherein the uplink message comprises a radio resource control ("RRC") message from the target cell.

3. The method of claim 1, wherein the indicator comprises a flag indicating that the uplink message is the first message sent from the target cell.

4. The method of claim 3, wherein the flag comprises a re-established signaling radio bearer ("SRB") flag indicating that the RRC message is the first message on a re-established SRB flow.

5. The method of claim 1, wherein the uplink message is received from the DU over an F1 interface.

6. The method of claim 1, wherein the uplink message comprises an uplink RRC message transfer message.

7. The method of claim 1, further comprising:

receiving from the DU an other message comprising an indication that the DU supports sending one or more messages that include the indicator; and responsive to receiving the other message, waiting to reset the PDCP sequence number of the control plane traffic signaled from the UE until the CU receives the uplink message including the indicator.

8. A source network node in a telecommunications network, the source network node configured to provide a central unit ("CU"), the source network node comprising:

processing circuitry; and memory coupled to the processing circuitry and having instructions stored therein that are executable by the processing circuitry to cause the CU to perform operations comprising:

receiving information from a distributed unit ("DU") of the source network node alerting the CU to reset a packet data convergence protocol ("PDCP") sequence number of control plane traffic signaled from the communication device as a consequence of an event in the telecommunications network; and responsive to receiving the information, resetting the PDCP sequence number of the control plane traffic signaled from the communication device, wherein receiving the information comprises receiving from the DU an uplink message from a target cell and an indicator that the uplink message is a first message sent from the target cell.

9. The source network node of claim 8, wherein the uplink message comprises a radio resource control ("RRC") message from the target cell.

10. The source network node of claim 8, wherein the indicator comprises a flag indicating that the uplink message is the first message sent from the target cell.

11. The source network node of claim 10, wherein the flag comprises a re-established signaling radio bearer ("SRB") flag indicating that the RRC message is the first message on a re-established SRB flow.

12. A method performed by a distributed unit ("DU") of a source network node for coordination of control plane traffic management during a communication device reconfiguration in a telecommunications network, the method comprising:

signaling a message to a central unit ("CU") of the source network node comprising an indicator of timing of a packet data convergence protocol ("PDCP") sequence number for control plane traffic signaled from the communication device for an event in the telecommunications network, wherein signaling the message to the CU comprises signaling an uplink message from a target cell and the indicator that the uplink message is a first message sent from the target cell.

13. The method of claim 12, wherein the uplink message comprises a radio resource control ("RRC") message from the target cell.

14. The method of claim 12, wherein the indicator comprises a flag indicating that the uplink message is the first message sent from the target cell.

15. The method of claim 14, wherein the flag comprises a re-established signaling radio bearer ("SRB") flag indicating that the RRC message is the first message on a re-established SRB flow.

16. The method of claim 12, wherein the message is signaled by the DU to the CU over an F1 interface.

17. The method of claim 12, wherein the message comprises an uplink RRC message transfer message.

18. A source network node of a telecommunications network, the source network node configured to provide a distributed unit ("DU"), the source network node comprising:

processing circuitry; and memory coupled to the processing circuitry and having instructions stored therein that are executable by the processing circuitry to cause the DU to perform operations comprising:

signaling a message to a central unit ("CU") of the source network node comprising an indicator of timing of a packet data convergence protocol ("PDCP") sequence number for control plane traffic signaled from the communication device for an event in the telecommunications network, wherein signaling the message to the CU comprises signaling an uplink message from a target cell and the indicator that the uplink message is a first message sent from the target cell.

19. The source network node of claim 18, wherein the indicator comprises a flag indicating that the uplink message is the first message sent from the target cell.

20. The DU source network node of claim 19, wherein the flag comprises a re-established signaling radio bearer ("SRB") flag indicating that the RRC message is the first message on a re-established RB flow.

* * * * *